United States Patent [19]

Sanders, Jr. et al.

[11] Patent Number: 4,955,993

[45] Date of Patent: Sep. 11, 1990

[54] SEMI-PERMEABLE HOLLOW FIBER GAS SEPARATION MEMBRANES POSSESSING A NON-EXTERNAL DISCRIMINATING REGION

[75] Inventors: Edgar S. Sanders, Jr., Pittsburg; John A. Jensvold; Daniel O. Clark, both of Benicia; Frederick L. Coan, Pittsburg; Henry N. Beck, Walnut Creek; William E. Mickols, Martinez; Peter K. Kim, Danville; Wudneh Admassu, Concord, all of Calif.

[73] Assignee: The Dow Chemical Company, Midland, Mich.

[21] Appl. No.: 387,476

[22] Filed: Jul. 31, 1989

Related U.S. Application Data

[63] Continuation-in-part of Ser. No. 364,723, Jun. 9, 1989, abandoned, which is a continuation of Ser. No. 129,273, Dec. 7, 1987, Pat. No. 4,838,904.

[51] Int. Cl.$^5$ ...................... B01D 53/72; B01D 71/50
[52] U.S. Cl. ........................................... 55/16; 55/68; 55/158; 264/41; 264/184
[58] Field of Search ............................. 55/16, 68, 158; 210/500.22, 500.23, 500.40; 264/41, 173, 184

[56] References Cited

U.S. PATENT DOCUMENTS

| Re. 30,351 | 7/1980 | Hoehn et al. | 55/16 |
|---|---|---|---|
| 4,741,829 | 5/1988 | Takemura et al. | 210/500.23 |
| 4,838,904 | 6/1989 | Sanders, Jr. et al. | 55/16 X |

FOREIGN PATENT DOCUMENTS

| 294737 | 1/1989 | European Pat. Off. |
| 58-008511 | 1/1983 | Japan . |
| 59-166208 | 9/1984 | Japan . |

Primary Examiner—Robert Spitzer

[57] ABSTRACT

The invention is a semi-permeable hollow fiber gas separation membrane possessing a non-external discriminating region fabricated from hydrophobic polymeric materials possessing less than about 1 weight percent equilibrium water content at about 25° C. The invention includes a process for making such membranes as well as a method of using such membranes.

106 Claims, No Drawings

SEMI-PERMEABLE HOLLOW FIBER GAS SEPARATION MEMBRANES POSSESSING A NON-EXTERNAL DISCRIMINATING REGION

CROSS-REFERENCE TO RELATED APPLICATIONS

This application is a continuation-in-part of U.S. patent application Ser. No. 364,723, filed June 9, 1989, now abandoned which in turn is a continuation of U.S. patent application Ser. No. 129,273, filed Dec. 7, 1987, now U.S. Pat. No. 4,838,904.

BACKGROUND OF THE INVENTION

This invention relates to a semi-permeable hollow fiber gas separation membrane which possesses a non-external discriminating region. The invention further relates to methods for making and using such membranes.

In various industries, it is necessary or highly desirable to separate one gaseous component from other gaseous components in a gas mixture. Processes used to perform such separations include cryogenics, pressure swing adsorption, and membrane separations.

Membranes have been used to recover or isolate a variety of gases, including hydrogen, helium, oxygen, nitrogen, carbon monoxide, carbon dioxide, water vapor, hydrogen sulfide, ammonia, and/or light hydrocarbons. Applications of particular interest include the separation of air into enriched oxygen streams, which are useful for increasing the efficiency of fermentation processes and for enhancing combustion processes, and enriched nitrogen streams, which are useful for inert padding of flammable fluids and for increasing food storage times. Other applications of interest include the separation of hydrogen from gas mixtures containing gases such as nitrogen, carbon monoxide, carbon dioxide, and/or light hydrocarbons in addition to hydrogen. For example, the separation and use of hydrogen is often necessary in various hydrocracker, hydrotreater, and catalytic cracking processes used in the oil refinery industry. Membranes can be used to achieve such separations.

Such membrane separations are based on the relative permeability of two or more gaseous components through the membrane. To separate a gas mixture into two portions, one richer and one leaner in at least one gaseous component, the mixture is brought into contact with one side of a semi-permeable membrane through which at least one of the gaseous components selectively permeates. A gaseous component which selectively permeates through the membrane passes through the membrane more rapidly than at least one other gaseous component of the gas mixture. The gas mixture is thereby separated into a stream which is enriched in the selectively permeating gaseous component or components and a stream which is depleted in the selectively permeating gaseous component or components. The stream which is depleted in the selectively permeating gaseous component or components is enriched in the relatively non-permeating gaseous component or components. A relatively non-permeating gaseous component permeates more slowly through the membrane than at least one other gaseous component of the gas mixture. An appropriate membrane material is chosen for the gas mixture so that some degree of separation of the gas mixture can be achieved.

Membranes for gas separation have been fabricated from a wide variety of polymeric materials, including cellulose esters, polyimides, polyaramides, and polysulfones. An ideal gas separation membrane is characterized by the ability to operate under high temperature and/or pressure while possessing a high gas separation factor (selectivity) and high gas permeability. The problem is finding membrane materials which possess all the desired characteristics. Polymers possessing high gas separation factors generally have low gas permeabilities, while those polymers possessing high gas permeabilities generally have low gas separation factors. In the past, a choice between a high separation factor and a high gas permeability has been unavoidably necessary. Furthermore, some of the membrane materials previously used suffer from the disadvantage of poor performance under high operating temperatures and pressures.

Hollow fiber membranes are a preferred membrane configuration for gas separation applications because of their high surface area/volume ratio. The hollow fiber gas separation membranes of the prior art generally possess an external discriminating layer and an internal porous substructure, wherein the external discriminating layer and the internal porous substructure are comprised of the same polymeric material. A plurality of hollow fiber membranes are typically fabricated into a bundle and the feed gas mixture is introduced on the outside (shellside) of the hollow fiber bundle. However, introducing the feed gas mixture on the shellside of the hollow fiber bundle generally results in poor shellside flow distribution due to channeling and concentration polarization which adversely affect membrane separation performance. Internal (boreside) feed greatly reduces the problems associated with channeling and concentration polarization but boreside feed is not practical with conventional hollow fiber membranes possessing an external discriminating layer and internal porous substructure due to problems associated with condensation of the condensible components in the feed gas mixture within the porous substructure of the membrane, which adversely affects membrane separation performance. An additional problem encountered with conventional hollow fiber membranes possessing an external discriminating layer is damage to the external discriminating layer due to handling during fabrication and use which adversely affects membrane gas separation performance.

A membrane capable of separating a gaseous component from other gaseous components in a gas mixture which possesses high selectivity, high gas permeability, and ability to operate under extreme conditions of temperature and pressure is needed. Furthermore, what is also needed is a gas separation membrane possessing a non-external discriminating region so that boreside feed becomes practical and efficient and the membrane is less subject to damage upon handling during fabrication and use.

SUMMARY OF THE INVENTION

The invention is a semi-permeable hollow fiber membrane comprising a hydrophobic polymeric material possessing an equilibrium water content at about 25° C. of less than about 1 weight percent, wherein the hollow fiber membrane possesses a thin non-external discriminating region and at least one porous region, wherein the discriminating region functions to selectively separate at least one gaseous component from other gaseous components in a gas mixture, wherein the discriminating region and porous region(s) are comprised of the same polymeric material.

In another aspect, the invention is a process for separating at least one gaseous component from other gaseous components in a gas mixture comprising:

(A) contacting the internal surface of a semi-permeable hollow fiber membrane with a feed gas mixture under pressure, wherein the hollow fiber membrane separates a higher pressure region inside the hollow fiber membrane from a lower pressure region outside of the hollow fiber membrane;

(B) maintaining a pressure differential across the hollow fiber membrane under conditions such that at least one gaseous component in the feed gas mixture selectively permeates through the hollow fiber membrane from the inside higher pressure region to the outside lower pressure region;

(C) removing from the outside lower pressure region of the hollow fiber membrane permeated gas which is enriched in at least one gaseous component; and (D) removing from the inside higher pressure region of the hollow fiber membrane non-permeated gas which is depleted in at least one gaseous component;

wherein the hollow fiber membrane comprises a hydrophobic polymeric material possessing an equilibrium water content at about 25° C. of less than about 1 weight percent, wherein the hollow fiber membrane possesses a thin non-external discriminating region and at least one generally porous region, wherein the discriminating region and porous region(s) are comprised of the same polymeric material.

In another aspect, the invention is a process for preparing a semi-permeable hollow fiber membrane comprising:

(A) forming a mixture comprising:
  (i) a hydrophobic polymeric material possessing an equilibrium water content at about 25° C. of less than about 1 weight percent and which is capable of being formed into a hollow fiber membrane,
  (ii) at least one solvent for the polymeric material, and
  (iii) at least one non-solvent for the polymeric material;
  wherein the mixture comprises less than about 1 weight percent water;

(B) heating the mixture to a temperature at which the mixture forms a homogeneous fluid and possesses sufficient viscosity at extrusion conditions to permit extrusion of a hollow fiber membrane;

(C) extruding the mixture into a hollow fiber membrane using a core gas;

(D) passing the hollow fiber membrane through at least one gaseous quench zone under conditions such that the mixture cools and begins to phase separate while minimizing the loss of solvent(s) and non-solvent(s) from the external surface of the hollow fiber membrane;

(E) passing the hollow fiber membrane through at least one liquid quench zone comprising a liquid in which the polymeric material possesses low solubility, wherein at least a portion of the solvent(s) and non-solvent(s) are removed from the hollow fiber membrane; and (F) simultaneously or consecutively passing the hollow fiber membrane through at least one liquid leach zone comprising a liquid in which the polymeric material possesses low solubility, wherein a substantial portion of the remaining solvent(s) and non-solvent(s) is removed from the hollow fiber membrane;

wherein the hollow fiber membrane so formed possesses a thin non-external discriminating region and at least one generally porous region, wherein the discriminating region functions to selectively separate at least one gaseous component from other gaseous components in a gas mixture.

The hollow fiber membranes of this invention demonstrate surprisingly high gas separation factors and high gas permeabilities for the separation of at least one gaseous component from other gaseous components in a gas mixture. In particular, the membranes of this invention are useful for the separation of hydrogen from gas mixtures containing hydrogen, as well as for the separation of oxygen and nitrogen from air. Furthermore, the membranes of this invention possess good mechanical properties and therefore are useful under more extreme conditions of, for example, temperature and pressure. Feed gas mixtures may advantageously be introduced on the boreside of the hollow fiber membranes of this invention without adversely affecting membrane gas separation performance. The membranes are also less subject to damage due to handling during fabrication and use than the conventional hollow fiber membranes possessing an external discriminating layer.

DETAILED DESCRIPTION OF THE INVENTION

The hollow fiber membranes of this invention have a thin non-external discriminating region and at least one generally porous region, wherein the discriminating region functions to selectively separate at least one gaseous component from other gaseous components in a gas mixture, wherein the discriminating region and porous regions(s) are comprised of the same polymeric material. In certain embodiments, the hollow fiber membrane comprises a thin discriminating region at or near the internal surface of the hollow fiber membrane and a generally porous region extending from the discriminating region to the external surface of the hollow fiber membrane. In another embodiment, the hollow fiber membrane comprises a generally porous region at or near the external surface of the hollow fiber membrane, a generally porous region at or near the internal surface of the hollow fiber membrane, and a thin discriminating region generally situated between the two porous surface regions.

The generally porous region(s) in the hollow fiber membranes of this invention are capable of passing the feed gas mixture to be separated through such porous region(s) without appreciably inhibiting the transport of the feed gas mixture therethrough; that is, the porous region(s) present minimal resistance to the transport of the feed gas mixture therethrough. Within the porous region(s), a substantial majority of the pores have a pore size preferably between about 10 to about 10,000 Å, more preferably between about 10 to about 1,000 Å, even more preferably between about 10 to about 500 Å, most preferably between about 10 to about 150 Å. Substantial majority as used herein means that preferably at least about 60 percent, more preferably at least about 75 percent, even more preferably at least about 90 percent of the pores within the porous region possess a size within the indicated range. The discriminating region in the hollow fiber membranes of this invention functions to selectively separate at least one gaseous component from other gaseous components in the feed gas mixture.

The discriminating region in such membranes may be a dense region, a region of non-continuous porosity, or a region resembling a closed cell foam.

The membranes of this invention are prepared from hydrophobic polymeric materials which possess an equilibrium water content at about 25° C. as measured by ASTM D-570-81 of preferably less than about 1 weight percent, more preferably of less than about 0.75 weight percent, even more preferably of less than about 0.50 weight percent. Especially preferred hydrophobic polymeric materials include those which possess an equilibrium water content at about 25° C. as measured by ASTM D-570-81 of less than about 0.35 weight percent. Hydrophobic polymeric materials useful in this invention preferably include polycarbonates, polyesters, polyestercarbonates, polysulfones, polyolefins, polyphenylene oxides, polyphenylene sulfides, polyethers, fluorinated polyimides, polystyrenes, polyetherketones, polyetheretherketones, polyetherimides, and polyamideimides; more preferably polycarbonates, polyphenylene oxides, polysulfones, polyestercarbonates, polyesters, fluorinated polyimides, polyetheretherketones, and polyetherketones; even more preferably polycarbonates, polyphenylene oxides, and polysulfones; most preferably polycarbonates. The polymeric materials useful in this invention generally are commercially available or may be synthesized via conventional polymerization techniques. The polymeric materials useful in this invention should be polymerized to the extent that the polymeric material will form a hollow fiber membrane with sufficient mechanical strength to withstand use conditions. The polymeric materials preferably possess a molecular weight of about 40,000 or greater, more preferably of about 60,000 or greater, even more preferably of about 100,000 or greater.

A preferred class of polycarbonates useful in this invention include polycarbonates derived from bisphenols wherein a significant portion of the bisphenols used to prepare the polycarbonates are tetra-substituted; more preferably, the tetra-substituents are situated in the 3,5-positions on the aromatic or phenolic rings. The presence of a significant portion of the residue of tetra-substituted bisphenols in the polycarbonates enhances the separation properties of membranes that are prepared therefrom. Preferred tetra-substituents for the polycarbonates include tetrahalo-substituents and tetra-$C_{1-4}$ alkyl substituents; more preferred tetra-substituents include tetrahalo-substituents such as chlorine, bromine, and fluorine. More preferred tetrahalo-substituents include chlorine and bromine; even more preferred tetrahalo-substituents include bromine.

Preferably, at least about 25 weight percent of the bisphenol moieties in the polycarbonate backbone are tetrahalogenated, more preferably at least about 50 weight percent of the bisphenol moieties in the polycarbonate backbone are tetrahalogenated, even more preferably at least about 75 weight percent of the bisphenol moieties in the polycarbonate backbone are tetrahalogented. Polycarbonates which are especially preferred include those in which about 100 weight percent of the bisphenol moieties are tetrahalogenated. Examples of especially preferred polycarbonates in which about 100 weight percent of the bisphenol moieties are tetrahalogenated include 2,2-bis-(3,5-bromo-4-hydroxyphenyl)propane and 2,2-bis(3,5-chloro-4-hydryoxyphenyl)propane.

The polycarbonates useful in this invention preferably correspond to Formula I:

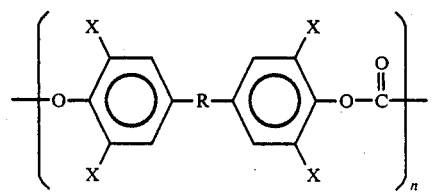

Formula I wherein
R is —CO—, —S—, —SO$_2$—, —O—, a $C_{1-6}$ divalent hydrocarbon radical, a $C_{1-6}$ divalent fluorocarbon radical, or an inertly substituted $C_{1-6}$ divalent hydrocarbon radical;
X at each occurrence is independently hydrogen, chlorine, bromine, fluorine, or $C_{1-4}$ alkyl; and
n is a positive real number, such that the polycarbonate possesses sufficient molecular weight to prepare a hollow fiber membrane with suitable characteristics.

R is preferably a $C_{1-6}$ divalent hydrocarbon radical, a $C_{1-6}$ divalent fluorocarbon radical, or an inertly substituted $C_{1-6}$ divalent hydrocarbon radical: more preferably a $C_{1-6}$ divalent hydrocarbon radical; even more preferably a $C_{1-6}$ alkylidene radical, especially a propylidene radical. X at each occurrence is independently preferably chlorine, bromine, fluorine, or $C_{1-4}$ alkyl; more preferably chlorine, bromine, or $C_{1-4}$ alkyl; even more preferably chlorine, bromine, methyl, or ethyl; especially chlorine or bromine. n is preferably a positive real number of about 25 or greater, more preferably of about 50 or greater.

The polycarbonates of this invention can be prepared by any process known in the art which prepares polycarbonates with suitable properties for hollow fiber membrane formation. See *Encyclopedia of Polymer Science & Technology*, Editor Mark et al., Interscience Division of John Wiley & Sons, N.Y., N.Y., 1969, Vol. 10, pp. 714–725, the relevant portions incorporated herein by reference. The polycarbonates useful in this invention should be polymerized to the extent that the polycarbonates will form a hollow fiber membrane with sufficient mechanical strength to withstand use conditions. Preferably, the polycarbonates possess an inherent viscosity of about 0.35 or greater and more preferably of about 0.40 or greater. The polycarbonates preferably possess a molecular weight of about 40,000 or greater, more preferably of about 60,000 or greater.

The solvent may be any solvent or mixture of solvents for the hydrophobic polymeric material which dissolve enough of the polymeric material so as to form a solution viscous enough to be extrudable at the extrusion temperature. The amount of solvent(s) used depends upon the polymeric material used, the non-solvent(s) used, the desired properties of the membrane, and the method of quenching and/or leaching the membrane. A solvent dissolves at least about 5 weight percent of the polymeric material at the extrusion temperature. Preferably the solvent(s) dissolves at least about 10 weight percent of the polymeric material at the extrusion temperature, more preferably at least about 25 weight percent of the polymeric material at the extrusion temperature. The particular solvents useful for each polymeric material are well known to those skilled in the art or readily ascertainable by those skilled in the art via conventional solubility test methods.

The following solvents are generally preferred for use in this invention. The glycol ethers preferred as solvents include those glycol ethers corresponding to the formula $R^3O-(CH_2CH_2O)_r-R^3$ wherein $R^3$ is methyl or ethyl, and r is an integer of between about 1 and about 20. Preferably r is an integer of between about 1 and about 10, more preferably between about 1 and about 4, even more preferably when $R^3$ is methyl r is between about 1 and about 4 and when $R^3$ is ethyl r is between about 2 and about 4. Examples of such glycol ethers include ethylene glycol dimethyl ether, diethylene glycol dimethyl ether, and bis(2-methoxy-ethyl ether). Dialkyl ketones preferred as solvents include dimethyl ketone, diethyl ketone, and methyl ethyl ketone. Substituted morpholines preferred as solvents include those morpholines with a $C_{1-10}$ alkyl, formyl, or $C_{1-10}$ alkanoyl moiety substituted on the nitrogen atom, more preferred are substituted morpholines with a $C_{1-4}$ alkyl, formyl or $C_{1-4}$ alkanoyl moiety substituted on the nitrogen atom Examples of such substituted morpholines include N-formylmorpholine and N-ethylmorpholine. Preferred pyrrolidinones useful as solvents include pyrrolidinone, N-methyl-2-pyrrolidinone, N-ethyl-2-pyrrolidinone, N-cyclohexyl-2-pyrrolidinone, N-benzyl-2-pyrrolidinone, and N-phenyl-2-pyrrolidinone, with N-methyl-2-pyrrolidinone and N-ethyl-2-pyrrolidinone being more preferred, and N-methyl-2-pyrrolidinone being even more preferred. The term pyrrolidinone as used herein refers to compounds named as pyrrolidinones and pyrrolidones. Preferred substituted benzenes useful as solvents include those benzenes corresponding to the formula:

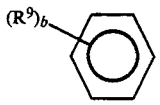

wherein $R^9$ is $C_{1-4}$ alkoxycarbonyl, nitro, halo or a formyl moiety; and b is an integer of about 1 to about 6, with the proviso that wherein $R^9$ is alkoxycarbonyl, b is 1. The preferred halogens are chlorine and bromine, with chlorine more preferred. Preferably b is between about 1 and about 3. Examples of substituted benzenes preferred as solvents include chlorobenzene, dichlorobenzene, benzaldehyde, nitrobenzene, ethyl benzoate, methyl benzoate, and 1,2,4-trichlorobenzene.

For polycarbonates, polyestercarbonates, and polyesters, more preferred solvents comprise N-methyl-2-pyrrolidinone, tetrahydrofuran, ethylene glycol dimethylether, diethylketone, N-ethylmorpholine, dimethylformamide, cyclohexanone, bis(2-methoxyethylether), N,N-dimethylacetamide, acetophenone, methylene chloride, sulfolane, and mixtures thereof; even more preferred solvents comprise N-methyl-2-pyrrolidinone, ethylene glycol dimethylether, tetrahydrofuran, diethylene glycol dimethylether, acetophenone, methylene chloride, cyclohexanone, and mixtures thereof; a most preferred solvent is N-methyl-2-pyrrolidinone. See also U.S. patent application Ser. No. 118,141, filed Nov. 6, 1987, the relevant portions incorporated herein by reference.

For fluorinated polyimides, more preferred solvents include N-methyl-2-pyrrolidinone, dimethylacetamide, dimethylformamide, and dimethylsulfoxide. For polysulfone, more preferred solvents include methylene chloride, chloroform, N-methyl-2-pyrrolidinone, sulfolane, dimethylsulfoxide, dimethylacetamide, and dimethylformamide. For polyphenylene oxide, more preferred solvents include methylene chloride, chloroform, toluene, benzene, caprolactam, and N-methyl-2-pyrrolidinone. For more preferred solvents for polyetheretherketone and polyetherketone, see U.S. patent application Ser. No. 107,699, filed Oct. 9, 1987, the relevant portions incorporated herein by reference. For more preferred solvents for polyphenylene sulfide, see U.S. patent application Ser. No. 107,630, filed Oct. 9, 1987, the relevant portions incorporated herein by reference. For more preferred solvents for stereoregular polystyrene, see U.S. patent application Ser. No. 239,476, filed Sept. 1, 1988, the relevant portions incorporated herein by reference.

The non-solvent may be any compound or mixture of compounds which do not substantially dissolve at the extrusion temperature the hydrophobic polymeric material, which are soluble in the solvent(s), and which aid in the formation of pores in the polymer rich phase when the mixture is extruded into a quench zone. Preferably the non-solvent(s) dissolve less than about 5 weight percent of the polymeric material present at the extrusion temperature. The amount of non-solvent(s) used depends upon the polymeric material used, the solvent(s) used, the desired properties of the membrane, and the method of quenching and/or leaching the membrane. The particular non-solvents useful for each polymeric material are well known to those skilled in the art or readily ascertainable by those skilled in the art.

The following non-solvents are preferred. The glycols and glycol ethers useful as non-solvents include those glycols and glycol ethers corresponding to the formula $R^4O-(CH_2CH_2O)_q-R^4$ wherein $R^4$ is independently in each occurrence hydrogen or $C_{1-4}$ alkyl, and q is an integer of about 1 to about 250. Preferably $R^4$ is hydrogen. Preferably q is an integer of about 2 to about 100, more preferably of about 3 to about 60, and even more preferably of about 3 to about 15. Examples of preferred glycols and glycols ethers include 2-ethoxyethanol, polyethylene glycols with molecular weights of up to about 1450, triethylene glycol, diethylene glycol, diethylene glycol dibutylether. Esters useful as non-solvents include those esters corresponding to the formula $R^5COOR^6$ wherein $R^5$ is hydrogen or $C_{1-19}$ alkyl, and $R^6$ is $C_{1-10}$ alkyl. Preferably $R^5$ is hydrogen or $C_{1-4}$ alkyl, and $R^6$ is $C_{1-4}$ alkyl. Even more preferably, $R^6$ is ethyl or methyl. Examples of preferred esters include methyl formate, ethyl formate, methyl acetate, n-octyl acetate, methyl laurate, methyl myristate, butyl stearate, and methyl stearate. Preferred alkanols useful as non-solvents include methanol, ethanol, 2-propanol, and 1-hexanol. Preferred cyclohexanes useful as non-solvents include those which are unsubstituted or substituted with a $C_{1-10}$ alkyl, $C_{3-10}$ cycloalkyl or $C_{1-4}$ perfluoroalkyl moiety. More preferred cyclohexanes useful as non-solvents include those which are unsubstituted or substituted with a $C_{1-4}$ alkyl, $C_{5-6}$ cycloalkyl or trifluoromethyl moiety. Examples of such cyclohexanes include cyclohexane, methylcyclohexane, isopropylcyclohexane, t-butylcyclohexane and dicyclohexyl. Preferred $C_{5-20}$ alkanes useful as non-solvents include hexane, dodecane, and hexadecane. Preferred dialkyl ketones useful as non-solvents include those ketones wherein one of the alkyl moieties is $C_{3-10}$ and the other is $C_{1-10}$. Examples of preferred dialkyl ketones useful for non-solvents include methyl isobutyl ketone, and diisopropyl ketone. Preferred amides useful as non-solvents include those amides corresponding to the formula $R^7CONHR^8$ wherein $R^7$ is preferably hydrogen or $C_{1-3}$ alkyl, and $R^8$ is preferably $C_{1-4}$ alkyl. Examples of preferred amides include N-methyl formamide and N-methyl acetamide. Preferred nitriles for use as nonsolvents include acetyl and $C_{1-3}$ alkyl nitriles. Examples of preferred nitriles include acetonitrile and propionitrile. Preferred aldehydes include $C_{1-4}$ alkyl aldehydes, with butyraldehyde even more preferred. Preferred substituted benzenes include formyl, alkyl, and cycloalkyl substituted benzenes corresponding to the formula:

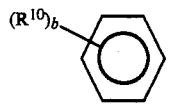

wherein $R^{10}$ is $C_{1-10}$ alkyl, $C_{3-10}$ cycloalkyl, or formyl, and b is as defined hereinbefore. Preferably $R^{10}$ is $C_{1-4}$ alkyl, $C_{5-6}$ cycloalkyl, or formyl.

Preferred non-solvents comprise triethylene glycol, 2-ethoxyethanol, diethylene glycol dibutyl ether, polyethylene glycols with molecular weights of up to about 1450, diethylene glycol, dodecane, hexadecane, cyclohexane, methylcyclohexane, perchloroethylene, diisopropylketone, isopropylketone, isopropylcyclohexane, t-butylcyclo-hexane, N-methylformamide, decylene, N-methylacetamide, tetralin, dicyclohexyl, cyclohexyl benzene, diethylene glycol dibutylether, carbon tetrachloride, water, and mixtures thereof. More preferred non-solvents comprise water, diisopropylketone, tetraethylene glycol dimethylether, diethylene glycol dibutyl ether, hexadecane, diethylene glycol, triethylene glycol, polyethylene glycol with molecular weights of up to about 1450, 2-ethoxyethanol, carbon tetrachloride, dodecane, and mixtures thereof. Even more preferred non-solvents are triethylene glycol and polyethylene glycols with molecular weights of up to about 400.

Certain solvents and non-solvents may cause degradation of the polymeric material if the polymer/solvent/non-solvent mixture is maintained at elevated temperatures for extended periods of time. The solvent(s) and non-solvent(s) should be chosen to minimize degradation of the polymeric material at the extrusion temperatures. The solvent(s) and non-solvent(s) should be compatible, that is, mutually soluble to an effective extent: in particular the non-solvent(s) should be at least partially soluble in the solvent(s), and the non-solvent(s) must be capable of forming pores in the quenched polymeric material in the presence of the solvent(s).

Skilled artisans often describe the solvent and non-solvent as a solvent/non-solvent pair. Generally preferred solvent/non-solvent pairs include N-methyl-2-pyrrolidinone and triethylene glycol, N-methyl-2-pyrrolidinone and a polyethylene glycol with a molecular weight of up to about 1450, ethylene glycol dimethylether and water, tetrahydrofuran and water, ethylene glycol dimethylether and diisopropylketone, tetrahydrofuran and diisopropylketone, diethylene glycol dimethylether and water, diethylene glycol dimethylether and tetralin, tetraethylene glycol dimethylether and N-methylacetamide, acetophenone and diethylene glycol dibutylether, methylene chloride and carbon tetrachloride, cyclohexanone and dodecane, and acetophenone and hexadecane. Generally more preferred solvent/non-solvent pairs include N-methyl-2-pyrrolidinone and triethylene glycol, cyclohexanone and dodecane, N-methyl-2-pyrrolidinone and a polyethylene glycol with a molecular weight of up to about 400, and acetophenone and hexadecane. Even more generally preferred solvent/non-solvent pairs include N-methyl-2-pyrrolidinone and triethylene glycol, and N-methyl-2-pyrrolidinone and a polyethylene glycol with a molecular weight of up to about 400.

Some compounds may be both a solvent and a non-solvent, wherein their function is dictated by the polymeric material and the temperature at which the membrane is formed.

In some embodiments, a solubilizing agent is used to aid in preparing a homogeneous polymer/solvent/non-solvent mixture. The solubilizing agent may be any solvent which aids in preparing such a homogeneous mixture. The solubilizing agent is preferably a solvent which possesses a boiling point lower than the extrusion temperature and the boiling points of the solvent(s) and non-solvent(s). The mixture may be formed at temperatures below the extrusion temperature. The solubilizing agent aids in forming a homogeneous mixture at such temperatures. Preferably the solubilizing agent flashes off, or is otherwise removed, prior to or during extrusion. Preferred solubilizing agents depend upon the particular polymeric material and generally include halogenated hydrocarbons, cyclic and non-cyclic ethers, and alkyl ketones. More preferred solubilizing agents generally include methylene chloride, tetrahydrofuran, methyl ethyl ketone, methyl iodide, and chloroform. An even more preferred solubilizing agent is methylene chloride.

The solubilizing agent is generally not used in embodiments wherein the mixture is mixed at elevated temperatures under high shear or with good mixing, wherein the mixture is to be extruded shortly after formation of the homogeneous mixture.

The polymer/solvent/non-solvent mixture comprise appropriate amounts of the polymeric material, solvent(s), and non-solvent(s) to be extrudable into the hollow fiber membranes of this invention at the extrusion temperatures. In particular, the mixture should possess an acceptable viscosity for such extrusion at the extrusion temperatures. The upper limit on the viscosity is that viscosity at which the mixture is too viscous to extrude. The lower limit on the viscosity is that viscosity at which the hollow fiber membrane loses its physical integrity after leaving the vicinity of the extrusion die or spinnerette. Preferably the viscosity of the mixture at the extrusion temperature is between about $1 \times 10^3$ and about $1 \times 10^7$ poise. Such a mixture is preferably homogeneous at extrusion temperatures. It is preferable that at the extrusion temperature, the mixture is close to the phase boundary between a one- phase mixture and a two-phase mixture. Therefore, the concentrations of the components in the mixture should be chosen such that the mixture is near the phase boundary at the extrusion temperature. Furthermore, if the polymer concentration is too high, the discriminating region will be too thick and the pores will be too small, thus reducing the gas flux through the formed membrane. If the polymer concentration is too low, the pores will be too large and the gas selectivity too low. Preferably, the mixture comprises between about 30 to about 65 percent by weight of the polymeric material, and about 35 to about 70 percent by weight of the combined solvent(s) and non-solvent(s). More preferably, the mixture comprises between about 35 to 60 percent by weight of the polymeric material, and about 40 to about 65 percent by weight of the combined solvent(s) and non-solvent(s). Even more preferably, the mixture comprises between about 40 to about 55 percent by weight of the polymeric material, and about 45 to about 60 percent by weight of the combined solvent(s) and non-solvent(s). The ratio of the solvent to the non-solvent is dependent upon the polymeric material, the solvent(s) and the non-solvent(s) used, the relative solubilities with respect to one another, and the amount of water present in the mixture. The solvent/non-solvent ratio is preferably chosen such that the mixture is near the phase boundary at the extrusion temperatures. The solvent(s) and non-solvent(s) preferably are present in a ratio of between about 0.5 to about 10, more preferably between about 1.0 to about 5.0, and even more preferably between about 2.0 to about 2.5. The presence of water in the mixture may have a significant affect on the phase separation properties of the mixture. The amount of water in the mixture can therefore be used to partially control the phase separation properties of the mixture. The maximum allowable amount of water in the mixture depends upon the polymeric material and the composition of the mixture. The mixture preferably contains less than about 1 weight percent water, more preferably less than about 5000 ppm water, even more preferably less than about 3500 ppm water, most preferably less than about 2000 ppm water.

The components of the mixture may be combined prior to extrusion by mixing in any convenient manner with conventional mixing equipment, as for example, in a Hobart mixer or a resin kettle, or using static mixers. Alternately, the mixture may be homogenized by extruding the mixture through a twin screw extruder, cooling the extrudate, and grinding or pelletizing the extrudate to a particle size readily fed to a single or twin screw extruder. The components of the mixture may also be combined directly in a melt-pot or twin screw extruder and extruded into hollow fiber membranes in a single step.

The mixture is heated to a temperature at which the mixture forms a homogeneous fluid and possesses sufficient viscosity at extrusion temperatures to permit extrusion of a hollow fiber membrane. Homogeneous fluid as used herein refers to a fluid in which the various components are substantially uniformly distributed. The upper limit on the pre-extrusion temperature is that temperature at which the polymeric material undergoes detrimental degradation in the presence of the particular solvent(s) and non-solvent(s). Detrimental degradation means herein that the polymeric material degrades sufficiently such that the viscosity of the mixture is significantly lowered below that viscosity at which an acceptable hollow fiber membrane can be formed. This is generally indicated by the point at which the hollow fiber membrane collapses in the gaseous quench zone. Pre-extrusion temperatures are dependent upon the polymeric material, the solvent(s) and non-solvent(s) used, and the concentrations of the components in the mixture. Preferably upper pre-extrusion temperatures are about 280° C. or below, more preferably about 230° C. or below, even more preferably about 200° C. or below. This upper pre-extrusion temperature limit is significantly affected by the type of extrusion apparatus that is used. Generally, a tradeoff exists between the temperature limit and the residence time in the heating area. With lower residence times, the mixture can be heated to higher temperatures. The lower limit on the pre-extrusion temperature is that temperature at which the viscosity of the mixture is sufficiently low enough to allow extrusion. Preferably lower pre-extrusion temperatures are about 50° C. or above, more preferably about 70° C. or above, even more preferably about 90° C. or above. Generally, the mixture is extruded at the temperatures hereinbefore described with respect to the pre-extrusion temperatures. Provided the temperature of the mixture during extrusion is within the functional limits hereinbefore described, the extrusion temperature may be significantly lower than the pre-extrusion temperature, for example, by as much as about 20° C. lower.

The heated mixture which forms a homogeneous fluid is extruded through a hollow fiber die or spinnerette. Hollow fiber spinnerettes are typically multi-holed and thus produce a tow of multiple hollow fibers. The hollow fiber spinnerettes include a means for supplying fluid to the core of the extrudate. The core fluid is used to prevent collapse of the hollow fibers as they exit the spinnerette. The core fluid preferably is a gas such as nitrogen, argon, air, carbon dioxide, or other inert gas. The core fluid pressure may be any pressure which prevents the hollow fiber membrane from collapsing and which does not deleteriously affect the properties of the hollow fiber membrane. The core fluid pressure is preferably between about 0.1 and 0.5 inches of water (2.54 and 2.70 kg/m$^2$), more preferably 0.25 and 0.4 inches of water (6.35 and 10.16 kg/m$^2$).

Following extrusion, the hollow fiber membrane is passed through at least one gaseous quench zone under conditions such that the mixture cools and begins to phase separate while minimizing the loss of solvent(s) and non-solvent(s) from the external surface of the hollow fiber membrane. Air is a convenient gas quench zone media. The temperature and residence time in the gaseous quench zone(s) should be sufficient such that the mixture begins to phase separate but does not undergo complete phase separation in said zone(s), while the hollow fiber membrane may optionally undergo significant draw down within the gaseous quench zone(s). The upper limit on the temperature of the gaseous quench zone(s) is that temperature below which the mixture possesses sufficient viscosity to retain its shape and integrity, while minimizing loss of solvent(s) and non-solvent(s) from the external surface of the hollow fiber membrane in order to prevent the formation of an external discriminating layer. Preferably upper temperatures are about 120° C. or below, more preferably about 90° C. or below, even more preferably about 40° C. or below. The lower temperature of the gaseous quench zone(s) is that temperature above which the mixture undergoes substantially complete phase separation while in the gaseous quench zone(s). Preferably lower temperatures are about 0° C. or above, more preferably about 10° C. or above, even more preferably about 20° C. or above. As noted hereinbefore, the temperatures and the residence time are interdependent variables; at lower temperatures the residence time is shorter, while at higher temperatures the residence time is longer, so as to achieve the desired results within the gaseous quench zone(s). Preferably the upper limit on the residence time in the gaseous quench zone(s) is about 10 seconds or less, more preferably about 6 seconds or less, even more preferably about 1 second or less. The lower limit on residence time is preferably about 0.05 seconds or greater, more preferably about 0.1 seconds or greater, even more preferably about 0.25 seconds or greater. Preferably the relative humidity within the gaseous quench zone(s) at about 24° C. is between about 20 to about 80 percent, more preferably between about 30 and about 70 percent, even more preferably between about 50 and about 70 percent. Shrouds may be used to help control the gas flowrate, temperature, and humidity in the gaseous quench zone(s).

Within the gaseous quench zone(s), the hollow fiber membrane is optionally drawn down or elongated to the appropriate size and thickness. Drawing down or elongating means the membranes are stretched such that the cross sectional area of the membrane is smaller at the end of the drawing or elongation process. Preferably the lower limit on the draw down or elongation ratio is about 1.0, more preferably about 1.5. Preferably the upper limit on the draw down or elongation ratio is about 15, more preferably about 10. The membrane may be drawn down in one or more stages with the option of using different draw rates and draw ratios in each stage. Line speeds are generally not critical and may vary significantly. Practical minimum preferred line speeds are at least about 10 feet/minute (3.05 meters/minute), more preferably at least about 30 feet/minute (9.14 meters/minute), even more preferably at least about 100 feet/minute (30.48 meters/minute). Practical maximum preferred line speeds are less than about 2000 feet/minute (609.6 meters/minute), more preferably less than about 1000 feet/minute (304.8 meters/minute), even more preferably less than about 500 feet/minute (152.4 meters/minute).

Following the gaseous quench zone(s), the membrane is passed into at least one liquid quench zone and optionally at least one liquid leach zone. Within the liquid quench and/or leach zone(s), the membrane substantially completes phase separation and a substantial portion of the solvent(s) and non-solvent(s) are removed. The liquid quench and/or leach zone(s) may comprise any liquid which dissolves both the solvent(s) and non-solvent(s) and which does not appreciably dissolve the polymeric material or deleteriously affect the separation or mechanical properties of the formed membrane. The liquid quench and/or leach media(s) is selected such that the polymeric material has a low solubility in the liquid media(s); the solubility of the polymeric material in the liquid media(s) is about 5.0 percent by weight or lower, more preferably about 3.0 percent by weight or lower, even more preferably about 1.0 percent by weight or lower, most preferably about 0.5 percent by weight or lower. Examples of preferred liquid quench or leach media include lower alcohols, water, fluorocarbons, lower aliphatic hydrocarbons, and mixtures thereof. Water is a suitably convenient liquid quench and/or leach media.

Optionally, after leaving the first liquid quench zone, the membrane may be passed through or contacted with other liquid quench or leach zones. The conditions of each liquid quench or leach zone is dependent upon the number of zones used and the conditions of the other zones. The conditions of the first liquid quench zone depends upon whether other liquid quench or leach zones are used. If only one liquid quench and/or leach zone is used, the conditions should be such that the membrane substantially completes phase separation and a substantial portion of the solvent(s) and non-solvent(s) is removed.

In the embodiment wherein only one combined liquid quench and/or leach zone is used, the upper temperature limit on the liquid quench zone is that temperature such that a substantial portion of the solvent(s) and non-solvent(s) is removed from the membrane while the membrane substantially completes phase separation within the liquid quench zone. Preferred upper temperatures are about 120° C. or below, more preferred are about 90° C. or below, even more preferred are about 50° C. or below, most preferred are about 30° C. or below. The lower temperature limit is that temperature at which the liquid quench zone freezes. Preferred lower temperatures are about 0° C. or above, more preferred are about 10° C. or above, even more preferred are about 20° C. or above. Operating at ambient temperature is generally sufficient and convenient. The residence time in the liquid quench zone should be sufficient to allow substantial completion of the phase separation of the membrane and to allow removal of a substantial portion of the solvent(s) and non-solvent(s). The residence time in the liquid quench zone may be as long as the economics of the process permit, provided that no deleterious affects result from such residence times, such as for example, damage to the membrane due to bacterial growth. Low levels of sterilizing agents such as bleach may be added to the storage liquid to prevent or inhibit bacterial growth. Residence times of up to several days may be used. Preferably the upper limit on the residence time is about 240 minutes or lower, more preferably about 120 minutes or lower, even more preferably about 60 minutes or lower, most preferably about 30 minutes or lower. Preferably, the lower residence time is about 0.5 minutes or longer, more preferably about 1 minute or longer, even more preferably about 2 minutes or longer, most preferably about 5 minutes or longer.

In a preferred embodiment, at least one liquid quench zone and at least one liquid leach zone are used. In this embodiment, the liquid quench zone temperature and residence time should be sufficient to result in at least partial phase separation of the membrane within said liquid quench zone(s), and to allow at least a portion of the solvent(s) and non-solvent(s) to be removed from the membrane. The lower temperature limit of the liquid quench zone(s) is that temperature at which the liquid quench media freezes. Generally, lower liquid quench zone temperatures are preferred. The preferred lower temperature is about 0° C. or greater. Preferably the upper temperature is about 30° C. or less, more preferably about 20° C. or less, even more preferably about 10° C. or less, most preferably about 6° C. or less. The lower limit on the residence time is preferably about 0.05 seconds or greater, more preferably about 0.1 seconds or greater, even more preferably about 0.5 seconds or greater, most preferably about 1 second or greater. The upper residence time is preferably about 600 seconds or less, more preferably about 300 seconds or less, even more preferably about 30 seconds or less, and most preferably about 20 seconds or less. The liquid leach zone(s) functions to remove substantially all of the remaining solvent(s) and non-solvent(s). The conditions of the liquid leach zone(s) should be such that substantially all of the remaining solvent(s) and non-solvent(s) are removed in the liquid leach zone(s) and such that phase separation of the membrane is substantially completed. The temperature of the liquid leach zone(s) is that temperature which facilitates the removal of the remaining solvent(s) and non-solvent(s) from the membrane. The lower limit on temperature is that temperature below which the solvent(s) and non-solvent(s) are no longer removed from the membrane at an acceptable rate. Preferred lower temperatures are about 50° C. or above, more preferred are about 70° C. or above, even more preferred are about 80° C. or above. The upper temperature limit on the liquid leach zone(s) is that temperature at which either the liquid leach media boils or the membrane properties are deleteriously affected. Preferred upper temperatures are about 120° C. or below, more preferred are about 100° C. or below, even more preferred are about 90° C. or below. Generally, as the temperature is lowered, the residence time required to achieve the same removal of solvent(s) and non-solvent(s) becomes longer. The residence time in the liquid leach zone should be sufficient to allow substantial completion of the phase separation of the membrane and to allow removal of a substantial portion of the remaining solvent(s) and non-solvent(s) at the leach zone(s) temperature. The residence time in the liquid leach zone(s) may be as long as the economics of the process permit, provided that no deleterious affects result from such residence times, such as for example damage to the membrane due to bacterial growth. Low levels of sterilizing agents such as bleach may be added to the storage liquid to prevent or inhibit bacterial growth. Residence times of up to several days may be used. Preferably the upper limit on the residence time is about 240 minutes or lower, more preferably about 120 minutes or lower, even more preferably about 60 minutes or lower. Preferably, the lower residence time is about 0.5 minutes or longer, more preferably about 1 minute or longer, even more preferably about 2 minutes or longer, most preferably about 5 minutes or longer.

The membrane is preferably dried, either before or after fabrication into a membrane device. The membrane may be dried by exposing it to air or another inert gas such as nitrogen, argon, or carbon dioxide which is sufficiently dry to aid in the removal of the quench and/or leach liquids from the membrane. Such exposure takes place at a temperature which does not deleteriously affect the separation or mechanical properties of the membrane and at which drying occurs at a reasonable rate, preferably between about 0° C. and about 100° C., more preferably between about 5° C. and about 90° C., even more preferably between about 10° C. and about 80° C. Such exposure may include a gentle flow of gas on the outside of the hollow fiber membrane either substantially perpendicular to the longitudinal direction of the membrane or along the longitudinal direction of the membrane. The drying gas may also be passed down the bore of the hollow fiber membrane. The membrane may also be dried under vacuum.

Alternately, the membrane may be pretreated before drying by contacting the membrane with either an organic compound such as an alcohol or water. See U.S. patent application Ser. No. 192,275, filed May 10, 1988, now U.S. Pat. No. 4,843,733, and U.S. patent application Ser. No. 269,922, filed Nov. 9, 1988, now U.S. Pat. No. 4,900,334, the relevant portions incorporated herein by reference. In still another alternate drying process, the membrane containing water is contacted with a non-polar organic compound prior to drying. See U.S. Pat. Nos. 4,068,387; 4,080,743; 4,080,744; 4,120,098; and 4,430,807; the relevant portions incorporated herein by reference.

In one preferred embodiment, the hollow fiber membrane is annealed before use. It is believed that annealing increases the gas separation factor by causing densification of the discriminating region. The hollow fiber membrane is exposed to temperatures above about 30° C. and below the glass transition temperature of the polymeric material for a period of time sufficient to partially densify the hollow fiber membrane discriminating region structure. This may optionally be performed under vacuum. Generally, annealing temperatures between about 30° and about 250° C. for about 1 minute to about 48 hours are preferred, more preferably temperatures between about 40° and about 200° C. for about 1 minute to about 48 hours.

The hollow fiber membranes of this invention preferably possess an outside diameter of between about 50 and about 500 microns, more preferably between about 100 and about 250 microns. The wall thickness of such membranes is preferably between about 5 and about 100 microns, more preferably between about 10 and about 50 microns. The hollow fiber membranes of this invention preferably exhibit transport properties similar to a dense membrane with an effective thickness of about 5 microns or less, more preferably of about 1.5 microns or less, even more preferably of about 0.5 microns or less, most preferably of about 0.1 microns or less. Effective thickness as used herein means that the membrane functions as if it is a homogeneous (dense) flat membrane of such thickness.

The hollow fiber membranes are fabricated into membrane devices by methods known in the art. The hollow fiber membrane is generally sealingly mounted in a vessel or case in such a manner that the hollow fiber membrane separates the vessel into two fluid regions wherein fluid flow between the two regions is accomplished by fluid permeating through the membrane. The hollow fiber membrane separates a higher pressure region into which the feed gas mixture is introduced from a lower pressure region. One side of the hollow fiber membrane is contacted with the feed gas mixture under pressure, while a pressure differential is maintained across the membrane. At least one gaseous component in the feed gas mixture selectively passes through the hollow fiber membrane more rapidly than the other gaseous components in the feed gas mixture. Gas which is enriched in at least one gaseous component is thus obtained in the lower pressure region as permeate. Gas depleted in at least one gaseous component is obtained in the higher pressure region which is removed as non-permeate. As used herein, semi-permeable membrane refers to a membrane which displays different permeabilities for different species of molecules, and therefore may be used in the separation of molecules having different permeabilities across the membrane. Permeate as used herein refers to those species which permeate through the membrane at a faster rate than other species. Non-permeate as used herein refers to those species which permeate at a slower rate than the other species present.

This invention is a process for separating at least one gaseous component from other gaseous components in a gas mixture containing gases such as hydrogen, helium, oxygen, nitrogen, carbon monoxide, carbon dioxide, ammonia, hydrogen sulfide, water vapor, and light hydrocarbons. As used herein, the term light hydrocarbons refers to gaseous saturated and unsaturated $C_{1-4}$ hydrocarbons. The process is carried out at pressures and temperatures which do not deleteriously affect the hollow fiber membranes. Preferably, the pressure on the higher pressure side of the hollow fiber membrane is between about 35 psig (about 241 kPa) and about 2000 psig (about 13,790 kPa), more preferably between about 100 psig (about 689 kPa) and about 1000 psig (about 6895 kPa), even more preferably between about 100 psig (about 689 kPa) and about 500 psig (about 3,447 kPa). The pressure differential across the hollow fiber membrane is preferably between about 15 psig (about 103 kPa) and about 1500 psig (about 10,342 kPa), more preferably between about 50 psig (about 345 kPa) and about 500 psig (about 3,447 kPa). The temperature at which the feed gas mixture is contacted with the hollow fiber membrane is preferably between about 0° and 150° C., more preferably between about 5° and 100° C. The feed gas mixture may be introduced on the outside or inside of the hollow fiber membrane. Preferably, the feed gas mixture is introduced on the inside of the hollow fiber membrane such that the higher pressure region is on the inside of the hollow fiber membrane and the lower pressure region is on the outside of the hollow fiber membrane.

Gas permeability is defined as $$P = \frac{\text{(amount of permeant) (membrane thickness)}}{\text{(area) (time) (driving force across the membrane)}}.$$

A standard permeability measurement unit is the Barrer (Ba), which is equal to $$10^{-10} \frac{(\text{centimeter})^3 \ (STP) \ (\text{centimeter})}{(\text{centimeter})^2 \ (\text{second}) \ (\text{centimeter Hg})},$$

abbreviated hereinafter as $$10^{-10} \frac{cm^3 \ (STP) \ cm}{cm^2 \ s \ cmHg}.$$

The reduced gas flux is defined as (permeability) ÷ (membrane thickness). A standard reduced flux unit is $$10^{-6} \frac{(\text{centimeter})^3 \ (STP)}{(\text{centimeter})^2 \ (\text{second}) \ (\text{centimeter Hg})},$$

abbreviated hereinafter as $$10^{-6} \frac{cm^3 \ (STP)}{cm^2 \ s \ cmHg}.$$

The gas separation factor (gas selectivity) is defined as the ratio of the permeability or flux of the faster permeating gas to the permeability or flux of the slower permeating gas.

The hollow fiber membranes of this invention preferably possess a separation factor for oxygen/nitrogen at about 25° C. of at least about 2, more preferably of at least about 4. The hollow fiber membranes of this invention preferably possess a gas separation factor for hydrogen/nitrogen at about 25° C. of at least about 13, more preferably of at least about 40. The hollow fiber membranes of this invention preferably possess a gas separation factor for hydrogen/light hydrocarbons at about 25° C. of at least about 12, more preferably of at least about 25, even more preferably of at least about 50.

The hollow fiber membranes of this invention preferably have a reduced gas flux for oxygen of at least about $1 \times 10^{-7}$ cm$^3$(STP)/(cm$^2$sec cmHg), more preferably of at least about $5 \times 10^{-7}$ cm$^3$(STP)/(cm$^2$sec cmHg). Such hollow fiber membranes preferably possess a permeability for oxygen of at least about 0.1 Ba, more preferably of at least about 0.5 Ba. The hollow fiber membranes of this invention preferably have a reduced gas flux for hydrogen of at least about $1 \times 10^{-5}$ cm$^3$(STP)/(cm$^2$sec cmHg), more preferably of at least about $5 \times 10^{-5}$ cm$^3$(STP)/(cm$^2$sec cmHg) or greater. Such hollow fiber membranes preferably possess a permeability for hydrogen of at least about 5 Ba, more preferably of at least about 10 Ba.

The polycarbonate hollow fiber membranes of this invention preferably possess a separation factor for oxygen/nitrogen at about 25° C. of at least about 3, more preferably of at least about 6; a gas separation factor for hydrogen/nitrogen at about 25° C. of at least about 15, more preferably of at least about 40; a gas separation factor for hydrogen/light hydrocarbons at about 25° C. of at least about 25, more preferably of at least about 50. Polycarbonate hollow fiber membranes of this invention preferably have a reduced gas flux for oxygen of at least about $1 \times 10^{-6}$ cm$^3$(STP)/(cm$^2$sec cmHg), more preferably of at least about $3 \times 10^{-6}$ cm$^3$(STP)/(cm$^2$sec cmHg); a reduced gas flux for hydrogen of at least about $1 \times 10^{-5}$ cm$^3$(STP)/(cm$^2$sec cmHg), more preferably of at least about $5 \times 10^{-5}$ cm$^3$(STP)/(cm$^2$sec cmHg).

The polysulfone hollow fiber membranes of this invention preferably possess a separation factor for oxygen/nitrogen at about 25° C. of at least about 3, more preferably of at least about 4.8; a gas separation factor for hydrogen/nitrogen at about 25° C. of at least about 27, more preferably of at least about 43; a gas separation factor for hydrogen/methane at about 25° C. of at least about 30, more preferably of at least about 48. Polysulfone hollow fiber membranes of this invention preferably have a reduced gas flux for oxygen of at least about $0.8 \times 10^{-6}$ cm$^3$(STP)/(cm$^2$sec cmHg), more preferably of at least about $2.4 \times 10^{-6}$ cm$^3$(STP)/(cm$^2$sec cmHg): a reduced gas flux for hydrogen of at least about $7.2 \times 10^{-6}$ cm$^3$(STP)/(cm$^2$sec cmHg), more preferably of at least about $21 \times 10^{-6}$ cm$^3$(STP)/(cm$^2$sec cmHg).

The polyphenylene oxide hollow fiber membranes of this invention preferably possess a separation factor for oxygen/nitrogen at about 25° C. of at least about 2.2, more preferably of at least about 3.5; a gas separation factor for hydrogen/nitrogen at about 25° C. of at least about 13, more preferably of at least about 21; a gas separation factor for hydrogen/methane at about 25° C. of at least about 12, more preferably of at least about 21. Polyphenylene oxide hollow fiber membranes of this invention preferably have a reduced gas flux for oxygen of at least about $1.1 \times 10^{-5}$ cm$^3$(STP)/(cm$^2$sec cmHg), more preferably of at least about $3.4 \times 10^{-5}$ cm$^3$(STP)/(cm$^2$sec cmHg); a reduced gas flux for hydrogen of at least about $7 \times 10^{-5}$ cm$^3$(STP)/(cm$^2$sec cmHg), more preferably of at least about $21 \times 10^{-5}$ cm$^3$(STP)/(cm$^2$sec cmHg).

The fluorinated polyimide hollow fiber membranes of this invention preferably possess a separation factor for oxygen/nitrogen at about 25° C. of at least about 2.3, more preferably of at least about 4.5; a gas separation factor for hydrogen/nitrogen at about 25° C. of at least about 27, more preferably of at least about 43: a gas separation factor for hydrogen/methane at about 25° C. of at least about 78, more preferably of at least about 125. Fluorinated polyimide hollow fiber membranes of this invention preferably have a reduced gas flux for oxygen of at least about $5 \times 10^{-6}$ cm$^3$(STP)/(cm$^2$sec cmHg), more preferably of at least about $15 \times 10^{-6}$ cm$^3$(STP)/(cm$^2$sec cmHg): a reduced gas flux for hydrogen of at least about $16 \times 10^{-5}$ cm$^3$(STP)/(cm$^2$sec cmHg), more preferably of at least about $17.8 \times 10^{-5}$ cm$^3$(STP)/(cm$^2$sec cmHg).

The hollow fiber membrane gas separation process of this invention may optionally be combined with non-membrane separation processes such as cryogenics (low temperature distillation) and pressure swing adsorption.

SPECIFIC EMBODIMENTS

The following Examples are included for illustrative purposes only and are not intended to limit the scope of the Claims or the invention. Unless otherwise stated, all parts and percentages are by weight. Molecular weights as used herein are weight-average molecular weights measured using narrow molecular weight range polystyrene standards.

EXAMPLES 1–14

In order to form a basis from which comparisons may be made, a set of standard extrusion and downstream processing conditions are developed for tetrabromobisphenol A polycarbonate hollow fiber membranes. A series of fourteen experiments using a standard set of conditions are performed to prepare hollow fiber membranes which are tested for oxygen and nitrogen flux rates. The gas fluxes and separation factors for these fourteen experiments are averaged to give a performance standard against which other experiments may be compared.

A composition of about 52 weight percent tetrabromobisphenol A polycarbonate, about 32.5 weight percent N-methyl-2-pyrrolidinone (NMP) (solvent), and about 15.5 weight percent triethylene glycol (TEG) (non-solvent), (solvent to non-solvent ratio of about 2.1) is fed into the melt pot of a melt pot extruder. Methylene chloride in an amount equal to about 30 weight percent of the total composition is added to the melt pot. The mixture is heated to about 95° C. at least until the mixture becomes a homogeneous solution. Most of the methylene chloride flashes off during this heating step. A nitrogen purge is passed into the melt pot at about 500 cubic centimeters per minute, and nitrogen containing volatilized methylene chloride is withdrawn from the melt pot. From the melt pot, the mixture is passed to a transfer line and pumped to a hollow fiber spinnerette at a flow rate of about 15 grams per minute. The transfer line and spinnerette face are held at a temperature of about 75° C. The mixture is extruded into a hollow fiber through an annulus of about 254 microns (0.01 inch) with an outside diameter of about 1727 microns (0.068 inch) with a core gas pin feeding a core gas of nitrogen down the bore at a rate of about 8.8 standard cubic centimeters per minute. The line speed is about 100 feet per minute (30.48 meters per minute). The hollow fiber is extruded into an air quench zone of a length of about 1 foot (0.3048 meter) at ambient temperature. The fiber is passed into a quench bath of water at about 4° C. with a residence time of about 1.7 seconds. The fiber is taken up and thereafter placed in a bath of water at about 90° C. for about ten minutes. The fibers are hung vertically and dried by passing air over the fibers at a flow rate of about 100 feet per minute (30.48 meters per minute) over the fibers for about two hours. The fibers prepared have a size of about 140×94 microns (OD×ID). The membranes prepared in Examples 1 and 14 are examined by scanning electron microscopy (SEM). Such membranes have a porous outer surface, a porous inner surface, and a region which separates oxygen from nitrogen as demonstrated by the measured separation factors for oxygen and nitrogen.

Gas Flux Testing Procedure

After the fiber is dried, the fibers are tested for gas separation properties. The test device is a pressure vessel with four ports, two tubesheet ports, one feed port through which the compressed gas enters the vessel, and an exit or purge port through which the compressed gas can be purged from the vessel. Two hundred ten (210) fibers are passed into one of the tubesheet ports and out the other tubesheet port allowing for about a 31.5 centimeter length of the fibers to be contained within the test device. Epoxy tubesheets are formed in the two tubesheet ports to give a leak-tight bond between the fiber and the two ports. Test units are then pressurized on the shellside with nitrogen at about 50 psig (344.7 kPa) by allowing compressed nitrogen to enter the test device through the feed port while leaving the exit port closed. The exit port is then opened for about two minutes to purge the vessel of air and then the exit port is closed with pure nitrogen left in the vessel. With the exit port closed and the feed port opened, the gas contained within the test device, by means of a pressure driving force, permeates through the walls of the hollow fibers and passes through the lumen of the fibers and out through the tubesheet ports, where the flowrate is measured either by means of bubble or mass flow meters. There is negligible back pressure on the gas exiting the tubesheet. After testing with nitrogen, the feed gas is changed to oxygen and the vessel is purged for about two minutes to give pure oxygen at about 50 psig (344.7 kPa) in the test device. The amount of oxygen permeating through the fiber walls is measured by combining the outputs from the two tubesheet ports. From these flow measurements, the gas flux rates and separation factors can be calculated by use of the following equations.

$$\text{Nitrogen flux} = \frac{\text{Measured flow (sccm)}}{\text{surface area of fiber (cm}^2\text{)} \times \text{pressure (cm Hg)} \times 60 \text{ (seconds/minute)}}.$$

$$\text{Oxygen flux} = \frac{\text{Measured flow (sccm)}}{\text{surface area of fiber (cm}^2\text{)} \times \text{pressure (cm Hg)} \times 60 \text{ (seconds/minute)}}.$$

The units are scc/(cm$^2$ sec cmHg).
Measured flow = standard cubic centimeters/minute.

Surface area of fibers = 3.14 × OD(outside diameter, cm) × length × the number of fibers.

Pressure (cmHg) = psi × 76/14.7.

The results are compiled in Table 1.

Separation factor is defined as the Oxygen flux divided by the Nitrogen flux.

TABLE 1

| Example | Oxygen Flux[2] | Oxygen/Nitrogen Separation Factor |
|---------|----------------|-----------------------------------|
| 1 | 4.8 ± .5 | 6.8 ± .1 |
| 2 | 7.4 ± .4 | 6.4 ± .1 |
| 3 | 6.2 ± .1 | 6.4 ± .3 |
| 4 | 7.6 ± .3 | 6.7 ± .1 |
| 5 | 7.0 ± .1 | 5.9 ± .1 |
| 6 | 5.8 ± .2 | 6.8 ± .2 |
| 7 | 9.0 ± .2 | 6.8 ± .2 |
| 8 | 8.3 ± .1 | 6.7 ± .1 |

TABLE 1-continued

| Example | Oxygen Flux[2] | Oxygen/Nitrogen Separation Factor |
|---|---|---|
| 9 | 7.2 ± .1 | 6.0 ± .2 |
| 10[1] | 4.4 ± .4 | 6.0 ± .2 |
| 11 | 6.5 ± .3 | 6.0 ± .5 |
| 12 | 6.1 ± .1 | 6.2 ± .1 |
| 13 | 7.4 ± .1 | 6.5 ± .1 |
| 14 | 8.1 ± .1 | 6.6 ± .2 |
| AVERAGE | 7.0 ± 1.1 | 6.4 ± .3 |

[1]Not included in average, suspect blend compostion.
[2]Units (1 × 10$^{-6}$) scc/(cm$^2$ sec cmHg).

EXAMPLES 15-36

Hollow fibers of tetrabromobisphenol A polycarbonate are prepared using the standard conditions described hereinbefore in Examples 1-14 using several different extrusion compositions. The hollow fibers prepared are tested for oxygen and nitrogen flux using the procedure hereinbefore described in Examples 1-14. The various extrusion compositions and results are compiled in Table 2. The extrusion compositions have about 1 to about 6 percent residual methylene chloride contained therein.

Example 35 is performed using different conditions than the other Examples. During the blend formation stage, the blend is heated to about 120° C. The spinnerette temperature is controlled at about 70° C. There is about a 9 inch (22.9 centimeter) air quench zone. The fiber is passed from the quench bath to a leach bath at ambient temperatures. The fiber is exposed to a further bath of water for about 10 minutes at about 80° C. Thereafter, the fiber is extracted with a mixture of about 50/50 isooctane/isopropanol by volume for about one hour. The fibers are examined by scanning electron microscopy. The membrane possesses a dense region on the outer surface and a porous region below the dense region: that is, the membrane possesses a conventional external skin and therefore is not an example of the invention.

TABLE 2
USE OF DIFFERENT EXTRUSION COMPOSITIONS

| Example | Polymer in Mixture wt percent | Solvent to Non-solvent ratio | Oxygen Flux[1] | Oxygen/Nitrogen Separation Factor | Melt Pot Temperature °C. |
|---|---|---|---|---|---|
| 15 | 45 | 2.1 | 6 ± .5 | 3 ± .4 | 85 |
| 16 | 45 | 2.1 | 2. ± 1 | 5 ± .3 | 110 |
| 17 | 45 | 2.5 | 1.7 ± .1 | 5 ± .5 | 85 |
| 18 | 45 | 2.3 | 5 ± .9 | 2.4 | 110 |
|  |  |  | 2 ± .2 | 4.0 |  |
| 19 | 52 | 2.1 | 8 ± 1 | 6.5 ± .3 | 98 |
| 20 | 52 | 2.0 | 10 ± 1 | 6.5 ± .3 | 98 |
| 21 | 44 | 1.9 | 4.2 ± .2 | 3.5 ± .2 | 80 |
| 22 | 44 | 2.1 | 4 ± .2 | 3.9 ± .3 | 80 |
| 23 | 44 | 2.3 | 2 ± .2 | 3.8 ± .1 | 80 |
| 24 | 50 | 2.1 | 7 ± .1 | 5.5 ± .1 | 92 |
| 25 | 54 | 2.1 | 7.3 ± .1 | 6 ± .1 | 92 |
| 26 | 51 | 1.9 | 5.4 ± .2 | 5.3 ± .2 | 95 |
| 27 | 51 | 2.1 | 7 ± .4 | 5.8 ± .2 | 95 |
| 28 | 53 | 2.1 | 3.6 ± .3 | 6.3 ± .4 | 95 |
| 29 | 53 | 1.9 | 2.8 ± .4 | 5.5 ± .1 | 95 |
| 30 | 53 | 1.9 | 4.8 ± .2 | 6.7 ± .1 | 95 |
| 31 | 52 | 1.9 | 9.7 ± .4 | 4.3 ± .5 | 95 |
| 32 | 52 | 2.0 | 9.8 ± .1 | 6.2 ± .2 | 95 |
| 33 | 52 | 2.05 | 9.1 ± .3 | 6.1 ± .1 | 95 |
| 34 | 52 | 2.3 | * | * | * |
| 35 | 50 | NMP only | .021 | 6.4 | 105 |
| 36 | 52 | 25 | 0.2 ± 0.5 | *** | *** |

*Fiber did not phase separate.
**Composition not extrudable.
***Not measurable, flow rates less than 0.05.
[1]Units (1 × 10$^{-6}$ scc/cm$^2$sec cmHg).

EXAMPLES 37-40

Hollow fibers are prepared from extrusion compositions containing tetrabromobisphenol A polycarbonate of two different molecular weights than the molecular weights of the polycarbonate used to determine the standard conditions in Examples 1-14. The extrusion conditions used otherwise are similar to those described in Examples 1-14. The polymer content of the extrusion composition and the solvent to non-solvent ratio is described in Table 3. The gas fluxes are measured as described in Examples 1-14. The results are contained in Table 3.

TABLE 3
USE OF VARIOUS POLYMERS WITH DIFFERENT MOLECULAR WEIGHTS

| Example | $M_w$[1] | Polymer in Mixture wt percent | S/NS[2] | Oxygen Flux[3] | Oxygen/Nitrogen Separation Factor | Melt Pot Temperature °C. |
|---|---|---|---|---|---|---|
| 37 | 125,000 | 52 | 2.1 | 6.1 | 2.8 | 80 |
| 38 | 191,000 | 52 | 2.10 | 9.5 | 4.0 | 95 |
| 39 | 191,000 | 52 | 2.13 | 9.4 | 6.8 | 95 |
| 40 | 191,000 | 52 | 2.16 | 7.6 | 6.6 | 98 |
| Standard Conditions | 163,000 | 52 | 2.1 | 7.0 | 6.4 | 95 |

[1]The stated values are rounded to the nearest thousand.
[2]S/NS is the solvent non-solvent ratio.
[3]Units (1 × 10$^{-6}$) scc/(cm$^2$ sec cmHg).

EXAMPLES 41-44

Hollow fibers of tetrabromobisphenol A polycarbonate are prepared using the standard conditions described in Examples 1-14 using three different line speeds and the fibers are tested for oxygen and nitrogen flux. The length of the quench zones are adjusted to keep the residence times of the fibers in the zones constant. The gas fluxes are measured as described in Examples 1-14. The conditions and the results are compiled in Table 4.

TABLE 4
FIBER PROPERITES AS A FUNCTION OF LINE SPEED

| Example | Line Speed (Feet/Minute) | Oxygen Flux[3] | Oxygen/Nitrogen Separation Factor | Fiber Size (Microns) |
|---|---|---|---|---|
| 41 | 50[1] | 5.13 ± .28 | 5.44 ± .28 | 140 × 94 |
| 42 | 100[1] | 7.02 ± .1 | 5.85 ± .10 | 140 × 94 |
| 43 | 100[2] | 5.79 ± .18 | 6.80 ± .20 | 140 × 94 |
| 44 | 150[2] | 5.59 ± .10 | 7.21 ± .20 | 140 × 94 |

[1]Fibers in Examples 41-42 are prepared from the same melt pot run.
[2]Fibers in Examples 43-44 are prepared from the same melt pot run.
[3]Units ($1 \times 10^{-6}$) scc/cm$^2$ sec cmHg).

EXAMPLES 45-60

Several tetrabromobisphenol A polycarbonate hollow fibers are prepared using the standard conditions with the exception that different fiber sizes are prepared. The fibers are tested for oxygen and nitrogen flux as described in Examples 1-14. The results are compiled in Table 5.

TABLE 5
FIBER PROPERTIES AS A FUNCTION OF FIBER SIZE

| Example | Fiber Size (Microns) | O$_2$Flux[1] | Oxygen/Nitrogen Separation Factor |
|---|---|---|---|
| 45* | 204 × 140 | 0.5 ± .08 | 6.4 ± .4 |
| 46 | 140 × 94 | 3.4 ± .21 | 5.3 ± .5 |
| 47 | 158 × 106 | 3.8 ± .5 | 6.7 ± .1 |
| 48 | 140 × 94 | 4.8 ± .5 | 6.8 ± .1 |
| 49 | 112 × 74** | 6.8 | 6.1 |
| 50 | 140 × 94 | 8.3 ± .1 | 6.7 ± .05 |
| 51 | 125 × 85 | 7.9 ± .1 | 6.5 ± .2 |
| 52 | 140 × 94 | 4.4 ± .4 | 6.0 ± .2 |
| 53 | 112 × 74 | 7.5 ± .1 | 5.6 ± 0.5 |
| 54 | 140 × 94 | 7.3 ± .3 | 5.8 ± .1 |
| 55 | 112 × 74 | 10.8 ± 1.0 | 5.3 ± .9 |
| 56 | 140 × 94 | 7.4 ± .1 | 6.5 ± .1 |
| 57 | 112 × 74** | 11 | 5.2 |
| 58 | 106 × 64 | 8.8 ± .3 | 5.3 ± .3 |
| 59 | 103 × 68 | 10.9 ± 1.3 | 3.7 ± 1.1 |
| 60 | 110 × 74 | 10.0 ± .8 | 4.0 ± 1.3 |

*The fiber is solvent dried with a 50/50 mixture of isooctane/isopropyl alcohol prior to testing.
**Result of only one out of four samples.
[1]Units ($1 \times 10^{-6}$) scc/(cm$^2$ sec cm Hg).

Examples 45-46 are generated from the same melt pot run. Examples 47-49 are generated from the same melt pot run. Examples 50-51 are generated from the same melt pot run. Examples 52-53 are generated from the same melt pot run. Examples 54-55 are generated from the same melt pot run. Examples 56-60 are generated from the same melt pot run.

The fiber size has a significant effect on the flux characteristics of the hollow fibers. In general, the smaller the fiber, the higher the intrinsic flux rate of oxygen, while the separation factor is less sensitive to fiber size.

EXAMPLES 61-68

Several tetrabromobisphenol A polycarbonate hollow fibers are prepared using the standard conditions hereinbefore described in Examples 1-14, with the exception that the residence time and the temperature of the quench bath is altered. The fibers are tested for oxygen and nitrogen flux as described in Examples 1-14. The results are compiled in Table 6.

TABLE 6
FIBER PROPERTIES AS A FUNCTION OF QUENCH BATH CONDITIONS

| Example | Residence Time (Seconds) | Temperature °C. | Oxygen Flux[1] | Oxygen/Nitrogen Separation Factor |
|---|---|---|---|---|
| 61 | 1.7 | 5° C. | 8.1 ± .1 | 6.0 ± .2 |
| 62 | 1.7 | 22° C. | 5.4 ± .2 | 6.1 ± .5 |
| 63 | 1.7 | 5° C. | 7.0 ± .1 | 5.9 ± .1 |
| 64 | 0.6 | 5° C. | 7.1 ± .3 | 5.4 ± .1 |
| 65 | 1.7 | 5° C. | 9.0 ± .2 | 6.8 ± .2 |
| 66 | 0.6 | 5° C. | 8.4 ± .2 | 6.9 ± .2 |
| 67* | 1.7 | 2° C. | 7.8 ± .1 | 6.1 ± .1 |
| 68* | 1.7 | 6° C. | 6.1 ± .3 | 6.0 ± .1 |

*Fiber size held at 140 × 94.
[1]Units ($1 \times 10^{-6}$) scc/(cm$^2$ sec cm Hg).

Examples 61 and 62, 63 and 64, 65 and 66, and 67 and 68, respectively, are from the same melt pot runs.

The residence time in the first liquid quench bath, from 1.7 to 0.6 seconds, has little effect on the ultimate performance of the fiber. Temperature has an effect on the gas flux properties. As the temperature is raised from 5° to 22° C., the oxygen flux is lowered. The selectivity of the fiber appears to be unaffected by this temperature change.

EXAMPLES 69-88

Several hollow fibers of tetrabromobisphenol A polycarbonate are prepared using the procedure hereinbefore described in Examples 1-14, with the exception that some of the hollow fibers are processed through a third bath of water placed between the first and second baths. The third bath is held at a temperature of about 20° C. and the residence time is about two minutes. The fibers are tested for oxygen and nitrogen flux as described in Examples 1-14. The results are compiled in Table 7. The total residence time of the fiber in the baths is the same whether two or three baths are used.

TABLE 7
GAS PROPERTIES OF FIBERS PROCESSED WITH AND WITHOUT A THIRD LIQUID BATH

| Example | Polymer wt percent | Third Bath | Oxygen Flux[1] | Oxygen/Nitrogen Separation Factor | Fiber Size (Microns) |
|---|---|---|---|---|---|
| 69 | 53 | Y | 4.6 ± 1 | 7.0 ± .2 | 140 × 94 |
| 70 | 52 | N | 4.8 ± 5 | 6.8 ± .1 | 140 × 94 |
| 71 | 52 | Y | 4.0 ± 3 | 6.7 ± .1 | 158 × 106 |
| 72 | 52 | N | 3.8 ± .5 | 6.7 ± .1 | 158 × 106 |
| 73 | 52 | Y | 6.9. ± 4 | 5.2 ± 7. | 112 × 74 |
| 74 | 52 | N | 6.8 | 6.1 | 112 × 74 |
| 75 | 50 | Y | 6.9 ± .1 | 5.5 ± .1 | 140 × 94 |
| 76 | 50 | N | 7.3 ± .6 | 5.1 ± .2 | 140 × 94 |

TABLE 7-continued

GAS PROPERTIES OF FIBERS PROCESSED WITH AND WITHOUT A THIRD LIQUID BATH

| Example | Polymer wt percent | Third Bath | Oxygen Flux[1] | Oxygen/Nitrogen Separation Factor | Fiber Size (Microns) |
|---|---|---|---|---|---|
| 77 | 50 | Y | 4.6 ± .2 | 5.5 ± .2 | 158 × 106 |
| 78 | 50 | N | 5.1 ± .5 | 5.0 ± .2 | 158 × 106 |
| 79 | 50 | Y | 12.5 ± .5 | 3.4 ± .2 | 112 × 74 |
| 80 | 50 | N | 14.0 | 3.5 | 112 × 74 |
| 81 | 54 | Y | 5.1 ± .1 | 5.8 ± .2 | 140 × 94 |
| 82 | 54 | N | 7.3 ± .1 | 6.0 ± .1 | 140 × 94 |
| 83 | 54 | Y | 2.3 ± .1 | 5.4 ± .1 | 158 × 106 |
| 84 | 54 | N | 4.2 ± .4 | 5.8 ± .1 | 158 × 106 |
| 85 | 54 | Y | 20.2 ± 3 | 1.4 ± .1 | 112 × 74 |
| 86 | 54 | N | 23.3 ± 2 | 1.4 ± .1 | 112 × 74 |
| 87 | 52 | Y | 4.8 ± .7 | 6.5 ± .1 | 140 × 94 |
| 88 | 52 | N | 7.4 ± .4 | 6.4 ± .1 | 140 × 94 |

[1]Units (1 × 10$^{-6}$) scc/(cm$^2$ sec cm Hg).

The presence of a third liquid bath demonstrates its greatest effect in Examples 81-86, where the polymer weight percentage is about 54. This is exhibited primarily in the oxygen flux rate, with little affect on the separation factor. Examples 69-74, 75-80, 81-86, and 87-88, respectively, are prepared from the same melt pot run.

EXAMPLE 89

A tetrabromobisphenol A polycarbonate hollow fiber is prepared using the standard procedure of Examples 1-14 with the addition of the third liquid bath. The fibers are analyzed for residual solvent and non-solvent after each bath. The temperature and residence in the third bath is about the same as the third bath in Examples 69-88. The total residence time of the fiber in the three baths is the same where two baths are used. The gas fluxes are measured as described in Examples 1-14. The results are compiled in Table 8.

TABLE 8

SOLVENT AND NON-SOLVENT CONTENT OF FIBER AT VARIOUS STAGES OF PROCESSING

| STAGE | PERCENT NMP* | PERCENT TEG* | PERCENT METHYLENE CHLORIDE |
|---|---|---|---|
| Pre-extrusion | 32.5 | 15.6 | 3.0 |
| After first bath | 15.7 | 7.5 | 0 |
| After second bath | 5.0 | 0 | 0 |
| After third bath | 0.7 | 0 | 0 |

Note:
About half of the solvent and non-solvent are removed in the air quench zone and first liquid quench (the bath temperature is about 4.5° C., and the residence time is about 1.7 seconds). The fiber size is about 140 × 94 microns.
*NMP = N-methyl-2-pyrrolidinone
*TEG = triethylene glycol

EXAMPLES 90-105

Several hollow fibers of tetrabromobisphenol A polycarbonate are prepared using the standard conditions of Examples 1-14 hereinbefore described, with the exception that the residence time and temperature of the second liquid bath are altered. The gas fluxes are measured according to the method described in Examples 1-14. Results are tabulated in Table 9.

TABLE 9

FIBER PROPERTIES AS A FUNCTION OF SECOND LIQUID BATH CONDITIONS

| Example | Temperature °C. | Time (Minutes) | Percent Residual solvent and Non-solvent | Oxygen Flux[1] | Oxygen/Nitrogen Separation Factor |
|---|---|---|---|---|---|
| 90 | 90 | 10 | <1 | 3.1 ± .1 | 6.6 ± .2 |
| 91 | 90 | ½ | 0 | 4.9 ± .4 | 6.4 ± .1 |
| 92 | 90 | 1 | 0 | 5.0 ± .3 | 6.4 ± .3 |
| 93 | 90 | 5 | 0 | 7.0 ± .2 | 6.5 ± .1 |
| 94 | 90 | 10 | 0 | 7.4 ± .4 | 6.4 ± .1 |
| 95 | 90 | 10 | 0 | 5.8 ± .2 | 6.8 ± .2 |
| 96 | 70 | 1 | 0 | 3.9 ± .4 | 7.0 ± .1 |
| 97 | 70 | 5 | 0 | 4.4 ± .1 | 7.3 ± .2 |
| 98 | 70 | 10 | 0 | 5.0 ± .2 | 6.8 ± .1 |
| 99 | 90 | 10 | 0 | 9.0 ± .2 | 6.8 ± .2 |
| 100 | 90 | 10 | *3 | 6.3 ± .2 | 7.0 ± .3 |
| 101 | 70 | 10 | 0 | 7.1 ± .1 | 7.0 ± .2 |
| 102 | 70 | 10 | *3 | 4.2 ± .2 | 7.3 ± .2 |
| 103 | 90 | 10 | 0 | 7.3 ± .3 | 5.8 ± .1 |
| 104 | 90 | 10 | *1 | 6.5 ± .3 | 5.9 ± .5 |
| 105 | 90 | 10 | *2 | 5.7 ± .2 | 6.3 ± .1 |

*Liquid bath has the described solvent percentages added thereto.
[1]Units (1 × 10$^{-6}$) scc/(cm$^2$ sec cmHg).

Examples 91-94, 95-98, 99-102, and 103-105, respectively, are prepared from the same melt pot run.

The gas flux is affected by the conditions of the second liquid bath. Higher temperature and residence time result in higher gas flux. Higher solvent content in the bath result in lowering the gas flux significantly while the separation factor rises slightly

EXAMPLES 106-111

Several hollow fiber tetrabromobisphenol A polycarbonate membranes are prepared in a manner similar to that of Examples 1-14 except that the time period between the first bath and the second bath is varied. The fibers are tested for oxygen and nitrogen flux as described in Examples 1-14. The results are compiled in Table 10. The membrane of Example 106 is examined by scanning electron microscopy and the membrane exhibits a porous outer and a porous inner surface.

TABLE 10

FIBER PROPERTIES RESULTING FROM DELAY BETWEEN THE TWO BATHS

| Example | Time Between Baths (Minutes) | O$_2$Flux[1] | Oxygen/Nitrogen Selectivity | Fiber Size (Microns) |
|---|---|---|---|---|
| 106 | 0 | 8.1 ± .1 | 6.0 ± .2 | 140 × 94 |
| 107 | 30 | 7.6 ± .3 | 6.7 ± .05 | 140 × 94 |
| 108 | 0 | 7.5 ± .1 | 5.6 ± .1 | 125 × 85 |
| 109 | 15 | 7.0 ± .1 | 6.1 ± .1 | 125 × 85 |
| 110 | 45 | 8.0 ± .3 | 6.7 ± .2 | 125 × 85 |
| 111 | 60 | 7.5 ± .1 | 6.0 ± .3 | 125 × 85 |

[1]Units (1 × 10$^{-6}$) scc/(cm$^2$ sec cmHg).

Examples 106-107 and 108-111, respectively, are from the same melt pot run.

Examples 106-111 demonstrate the fibers experience no deleterious effects due to longer times between the baths. In fact, the use of such a delay may be beneficial.

Examples 112-114

Two runs are performed wherein the are tetrabromobisphenol A polycarbonate hollow fibers dried immediately after removal from the second liquid bath. A third run is performed wherein the tetrabromobisphenol A polycarbonate hollow fibers are stored in water for about 20 hours between the second bath and the drying step. The fibers are tested for oxygen and nitrogen flux as described in Examples 1–14. The results are compiled in Table 11.

TABLE 11
EFFECT OF DELAY IN DRYING AFTER SECOND BATH

| Example | Water Storage Time (Hours) | Percent Solvent (In Second Bath) | Oxygen Flux[1] | Oxygen/Nitrogen Separation Factor |
|---|---|---|---|---|
| 112 | 0 | 0 | 5.1 ± .2 | 6.3 ± .3 |
| 113 | 0 | 2 | 1.3 ± .1 | 6.1 ± .1 |
| 114 | 20* | 0 | 7.3 ± .3 | 5.8 ± .1 |

[1]Units ($1 \times 10^{-6}$) scc/(cm$^2$ sec cmHg).

EXAMPLES 115–124

Several tetrabromobisphenol A polycarbonate hollow fibers are prepared with different amounts of residual N-methyl-2-pyrrolidinone (NMP) in the final fibers otherwise in accordance with the general extrusion method of Examples 1–14. The fibers are tested by the method disclosed in Examples 1–14 for oxygen and nitrogen flux. The membrane of Example 115 is examined by scanning electron microscopy and the membrane exhibits a porous outer and a porous inner surface. The results are compiled in Table 12.

TABLE 12
EFFECT OF RESIDUAL SOLVENT IN THE FIBERS ON PERMEATION

| Example | Percent NMP | O$_2$Flux[1] | Oxygen/Nitrogen Selectivity | Fiber Size (Microns) |
|---|---|---|---|---|
| 115 | 0.76 | 7.0 ± .3 | 5.8 ± .4 | 140 × 94 |
| 116 | 3.70 | 1.0 ± .4 | 6.3 ± .4 | 204 × 147 |
| 117 | 1.06 | 3.9 ± .4 | 6.7 ± .1 | 158 × 106 |
| 118 | 0.41 | 4.7 ± .4 | 6.9 ± .1 | 140 × 94 |
| 119 | 0.35 | 6.9 ± .4 | 5.6 ± .4 | 112 × 74 |
| 120 | 1.80 | 4.9 ± .4 | 6.4 ± .4 | 140 × 94 |
| 121 | 1.54 | 5.0 ± .3 | 6.4 ± .3 | 140 × 94 |
| 122 | 1.20 | 7.0 ± .2 | 6/5 ± .1 | 140 × 94 |
| 123 | 1.03 | 7.4 ± .4 | 6.4 ± .1 | 140 × 94 |
| 124* | 1.14 | 4.8 ± .7 | 6.5 ± .1 | 140 × 94 |

*A third liquid bath at 20° C. is used with a residence time of two minutes.
[1]Units ($1 \times 10^{-6}$) scc/(cm$^2$ sec cmHg).

The solvent content of the fiber prepared by the process correlates well with the intrinsic gas flux rates of the fiber. As the residual solvent in the fiber increases, the flux rate decreases.

EXAMPLES 125

Tetrabromobisphenol A polycarbonate is tested for solubility in several solvents and non-solvents. Weighed amounts of polymer and liquid are placed in 4 dram-capacity glass vials with polyethylene-lined caps. About 2.5 grams of liquid is generally used. Initial polymer concentration is about 5 weight percent. The vials are placed on mechanical rollers for at least 24 hours or until complete solution is affected. Additional polymer, if indicated, is added to prepare concentrations of about 10, 25, and 50 weight percent. Insoluble mixtures with liquid boiling points in excess of about 100° C. are placed in a 100° C. forced-air oven for at least 24 hours' observation or until solution is completed. The polymer is arbitrarily designated as being "insoluble" in the liquid if 5 weight percent or less dissolved; "moderately" soluble if 5–25 percent dissolved; and "soluble" if more than 25 percent dissolved. The results are compiled in Table 13.

TABLE 13
SOLUBILITY OF TETRABROMOBISPHENOL A IN VARIOUS COMPOUNDS

| Compound | Relative Solubility* |
|---|---|
| poly(dimethyl-siloxane) 50 cs. | I < 0.8% b f |
| perfluoro(methyl-cyclohexane) | I < 1.4% b |
| hexane | I < 1.6% b |
| triethylamine | I < 4.7% b |
| butyl stearate | I < 4.9% b f |
| methylcyclohexane | I < 4.6% b f |
| dioctyl phthalate | I < 4.7% b f |
| dodecane | I < 4.7% b f |
| isopropylcyclohexane | I < 4.95% b f |
| t-butylcyclohexane | I < 4.9% b f |
| hexadecane | I < 4.8% b f |
| diisopropyl ketone | I < 4.9% b f |
| cyclohexane | I < 4.8% b |
| bis(2-methoxyethyl) ether | S > 50.3% b |
| ethyl benzoate | S > 25.1 < 50.1% bcg@f |
| diethylene glycol dibutyl ether | I < 4.9% b f |
| triethyl orthoformate | I < 4.5% b f |
| methyl isobutyl ketone | I < 4.7% b f c |
| tricresyl phosphate | I < 5.0% b > 5.5% f |
| methyl myristate | I < 4.9% b f |
| triethylene glycol dimethylether | S > 50.4% b |
| n-octyl acetate | S > 50.5% b |
| dicyclohexyl | I < 4.8% b f |
| methyl laurate | I < 4.7% b f |
| tetraethylene glycol dimethylether | S > 50.3% b |
| carbon tetrachloride | I < 4.7% b |
| n-propylbenzene | I < 4.9% b f c |
| methyl stearate | I < 4.7% e f |
| piperidine | S > 26.3% b f d |
| xylene | I < 5.5% bc > 5.5% f |
| decahydronaphthalene (cis & trans) | I < 4.4% b f |
| ethylbenzene | I < 4.9% b f c |
| diethyl ketone | S > 50.2% b |
| toluene | I < 4.5% b f c |
| N-ethylmorpholine | S > 50.1% b |
| cyclohexyl acetate | S > 50.5% b |
| butyraldehyde | I < 4.8% b |
| tetrahydrofuran | S > 51.4% b |
| ethyl acetate | I < 4.7% b c |
| isophorone | S > 25.3 < 50.1b >50.1f |
| cyclohexylbenzene | I < 4.8% b f |
| thrichloroethylene | S > 50.2% b c |
| diacetone alcohol | I < 4.9% b f |
| 1,2,4-trichloro-benzene | S > 25.4 < 50.1bc? > 50f |
| perchloroethylene | I < 4.9% b f |
| chloroform | S > 50.8% b c |
| methyl ethyl ketone | S > 50.1% b c? |
| styrene | I < 4.7% b c |
| ethyl formate | I < 5.0% b c |
| benzaldehyde | S > 50.1% b f |
| tetrahydro-naphthalene | I < 4.8% b f |
| chlorobenzene | S > 50.4% b d g@f |
| methyl acetate | I < 4.8% b c |
| methylene chloride | S > 51.1% b c |
| acetone | I < 4.6% b c |
| cyclohexanone | S > 50.3% b |
| 1-cyclohexyl-2-pyrrolidinone | I < 4.7% b > 4.7% f |
| nitrobenzene | S > 50.3% b c? g@f |
| p-dioxane | S > 50.1% b |
| o-dichlorobenzene | S > 50.1% b d g@f |
| epsilon- | S > 25.3 < 50.1b > 50.1f |

TABLE 13-continued
SOLUBILITY OF TETRABROMOBISPHENOL A IN VARIOUS COMPOUNDS

| Compound | Relative Solubility* |
|---|---|
| caprolactone phenyl ether | S > 50.1% d f c?@b |
| methyl formate | I < 5.0% b |
| methyl iodide | S > 50.2 b |
| cyclopentanone | S > 50.3 b |
| hexamehtylphosphoramide | I < 4.9% b > 4.9% f |
| methyl benzoate | S > 50.5% b f c?@b |
| styrene oxide | S > 50.5% b f c?@b&f |
| 1-ethyl-2-pyrrolidinone | S > 50.1% b |
| acetophenone | S > 50.1% b |
| methyl salicylate | S > 25.6% < 50.1b > 50.1f |
| 1,1,3,3-tetramethylurea | S > 50.3 b c g@f |
| 1-bromonaphthalene | S > 25.3 < 50.0% bfc? |
| 1-hexanol | I < 4.7% b f |
| dimethyl phthalate | I < 4.9% b > 4.9% f |
| pyridine | S > 50.1% b |
| N,N-dimethylacetamide | S > 50.2% b |
| propionitrile | I < 4.9% b c |
| triethyl phosphate | I < 4.8%bc?d? > 4.8% f |
| dimethyl malonate | I < 4.8% b f |
| polyethylene glycol E400 | I < 2.2% b f |
| 1-acetylpiperidine | S > 50.1% b |
| 2-furaldehyde | S > 50.1% b |
| N-methylpyrrolidinone | S > 50.2% b |
| 1-benzyl-2-pyrrolidone | S > 25.9 < 50.1b > 50.1f |
| 2-propanol | I < 2.9% b |
| 1-formylpiperidine | S > 50.1% b |
| diiodomethane | S > 25.2% b f |
| acetonitrile | I < 4.9% b |
| dimethylsulfoxide | M = > 14.1% b f c |
| N,N-dimethylformamide | S > 55.0% b |
| gamma-butyrolactone | S > 50.2% b |
| ethanol | I < 3.9% b |
| nitromethane | I < 5.0% b f |
| N-formylmorpholine | S > 25.6 < 50.2b > 50.2f |
| sulfolane | I < 4.6% e > 4.6% f |
| methanol | I < 1.5% b |
| N-methylacetamide | I < 4.6% e f |
| 2-pyrrolidinone | S > 25.8 < 50.1b > 50.1f |
| diethyl ether | I < 4.6% b |
| ethylene glycol diethyl ether | I ≦ 5.3 b c |
| ethylene glycol dimethyl ether | S > 51.0% b |
| ethylene carbonate | I < 5.0% e f |
| malonitrile | I < 4.9% e f |
| N-methyl formamide | I < 5.0% b f |

*I = Insoluble: < = 5%; M = Moderately Soluble: 5-25%: S = soluble: > 25; b = at room temperature; c = insoluble fraction and/or solvated polymer and/or solvent-induced order; d = reacts with polymer; e = at 50° C.; f = at 100° C.; g = clear.

The behavior of about 27 compounds are marked by a "c". Such behavior includes (a) partial dissolution followed by opacification and whitening of the clear swollen polymer accompanied by cessation of further dissolution; this behavior is frequently accompanied by a hazy or cloudy supernatant liquid; (b) dissolution to give a clear solution followed by precipitation at the same temperature of white and opaque solid, mushy gel-like formation, or, at the extreme, a solidification to a "candle wax-like" solid: and (c) dissolution at elevated temperature followed by precipitation of solid, "gelation", and/or a hazy-cloudy formation in the supernatant liquid upon cooling. Seven particularly severe cases of this behavior are noted. Methylene chloride solutions containing about 51 percent polymer become hard candle wax-like solids after about 17 days' standing at room temperature. DMSO solutions contain about 14 percent polymer are readily formed at room temperature; they change to a white opaque slush after about 36 hours. Redissolution does not occur at elevated temperature. Chloroform solutions containing about 51 percent polymer are clear at room temperature but changed into candle wax-like solids after about 14 days. Chlorobenzene solutions containing about 50 percent polymer become clear stiff gels after about 11 days at room temperature. The gels become clear at 100° C. but become cloudy when cooled. Tetramethylurea containing about 50 percent polymer is clear and soluble at room temperature but becomes a rigid gel after about 8 days. The gel becomes clear at 100° C.; the clear solution becomes cloudy when cooled to room temperature. A clear solution of about 50 percent polymer in ethyl benzoate becomes a rigid, opaque gel after 11 days at room temperature. n-Propylbenzene dissolved less than 4.9 percent polymer at room temperature; solubility is almost complete at 100° C. The warm solution becomes a candle-like solid when cooled to room temperature.

Table 13 indicates several solvents and non-solvents which are good candidates for solvent non-solvent pairs useful for spinning polycarbonate membranes by the process disclosed herein.

EXAMPLES 126–129

Fibers of tetrabromobisphenol A polycarbonate are prepared using the same conditions as described in Examples 1-14, with the exception that a polyethylene glycol with a molecular weight of 400 is used as the non-solvent, and the solvent non-solvent ratio is adjusted. Fibers are produced with a porous inner surface and a porous outer surface as determined by scanning electron microscopy. After the fibers are prepared, the fibers are immersed in a solution of about 25 percent by volume of methanol in water for two hours. The fibers are tested as described in Examples 1-14 both before and after the immersion in the methanol and water solution, and the results are compiled in Table 14.

TABLE 14
USE OF POLYETHYLENE GLYCOL AS A NON-SOLVENT

| Example | Solvent Non-solvent Ratio | Oxygen Flux[1] | Oxygen/Nitrogen Separation Factor | Oxygen Flux[1] After Immersion | Separation Factor Immersion |
|---|---|---|---|---|---|
| 126 | 2.10 | 4.0 | 7.2 | 7.5 | 7.3 |

TABLE 14-continued

USE OF POLYETHYLENE GLYCOL AS A NON-SOLVENT

| Example | Solvent Non-solvent Ratio | Oxygen Flux[1] | Oxygen/Nitrogen Separation Factor | Oxygen Flux[1] After Immersion | Separation Factor Immersion |
|---------|---|---|---|---|---|
| 127 | 1.95 | 5.5 | 7.1 | 10.0 | 7.4 |
| 128 | 1.80 | 5.9 | 7.5 | | |
| 129 | 1.60 | 7.1 | 2.4 | | |

[1]Units ($1 \times 10^{-6}$) scc/(cm$^2$ sec cm Hg).

EXAMPLES 130-145

Fibers of tetrabromobisphenol A polycarbonate are prepared using the same conditions as described in Examples 1–14, with the exception that different non-solvents are used, and the solvent/non-solvent ratio is varied. After the fibers are prepared, the fibers prepared in Examples 135, 141, 143, and 145 are immersed in a solution of about 25 percent by volume of methanol in water for two hours. The fibers are tested as described in Example 1 and the results are compiled in Table 15. Those examples wherein the fibers are immersed in a methanol solution are tested after the immersion in the methanol solution. Membranes of Examples 133–135 are examined by scanning electron microscopy and the membranes exhibit porous outer surfaces and porous inner surfaces.

TABLE 15

USE OF VARIED NON-SOLVENTS

| Example | Non-solvent | Solvent Non-solvent Ratio | Oxygen Flux[1] | Oxygen/Nitrogen Separation Factor | Fiber Size microns |
|---------|-------------|---|---|---|---|
| 130 | polyethylene glycol 1450 | 1.8 | 3.31 ± .15 | 3.42 ± .32 | 140 × 90 |
| 131 | polyethylene glycol 1450 | 1.8 | 2.45 | 5.45 | 162 × 104 |
| 132 | ethylene glycol | 3.1 | 9.3 | 1.04 | 140 × 90 |
| 133 | ethylene glycol | 3.5 | .35 ± .08 | 7.8 ± 1.6 | 140 × 90 |
| 134 | ethylene glycol | 3.5 | .10 ± .01 | 5.1 ± 0.1 | 204 × 140 |
| 135 | ethylene glycol | 3.5 | 1.5 ± .1 | 6.7 ± 0.1 | 140 × 90 |
| 136 | ethylene glycol | 4.5 | 0.04 | 5.8 | 140 × 90 |
| 137 | ethylene carbonate | 1.5 | 0.074 | >7 | 140 × 90 |
| 138 | ethylene carbonate | 1.5 | 0.104 | 8.3 | 161 × 104 |
| 139 | ethylene carbonate | 1.5 | 0.10 | 6.7 | 125 × 80 |
| 140 | ethylene carbonate | 1.1 | 0.08 | >6 | 140 × 90 |
| 141 | ethylene carbonate | 1.1 | 0.16 | 8.7 | 140 × 90 |
| 142 | ethylene carbonate | 1.1 | 0.05 | >6 | 161 × 104 |
| 143 | ethylene carbonate | 1.1 | 0.17 | >6 | 161 × 104 |
| 144 | ethylene carbonate | 1.1 | 0.68 | 6.15 | 110 × 74 |
| 145 | ethylene carbonate | 1.1 | 20 ± 10 | 1.0 | 110 × 74 |

Polyethylene glycol 1450 is a polyethylene glycol with a molecular weight of about 1450.
[1]Units ($1 \times 10^{-6}$) scc/(cm$^2$ sec cm Hg).

EXAMPLES 146-148

Three membranes are prepared using the conditions described in Examples 1–14, and the resultant membranes are examined by scanning electron microscopy. All of the membranes exhibit a porous outer surface and a porous inner surface. The membranes are tested for gas separation properties as described in Examples 1–14 and the results are compiled in Table 16.

TABLE 16

| Example | Oxygen Flux[1] | Oxygen/Nitrogen Separation Factor |
|---------|---|---|
| 146 | 5.5 ± .2 | 6.6 ± .2 |
| 147 | 8.0 ± .1 | 6.0 ± .2 |
| 148 | 9.0 ± .3 | 6.8 ± .2 |

[1]Units ($1 \times 10^{-6}$) scc/(cm$^2$ sec cm Hg).

EXAMPLES 149-150

Hollow fibers are extruded from an extrusion blend containing about 50 weight percent tetrabromobisphenol A polycarbonate and about 50 weight percent N-methyl-2-pyrrolidinone and triethylene glycol in about a 2.3 solvent/non-solvent ratio as described in U.S. Pat. No. 4,772,392, the relevant portions incorporated herein by reference. The fibers are extruded in a twin screw extruder at about 55°–60° C. into an air quench zone at about 20°–50° C. for about 0.8 seconds before quenching the fibers in a water bath at about 3°–4° C. for about 2.5 seconds. The fibers are then leached in water at about 75°–85° C. for about 8 minutes before being dried. The fibers are fabricated into test units and the single gas fluxes measured as reported in Table 17 by a method similar to that described in Examples 1-14. Scanning electron micrographs of the fibers show a dense inside surface and a porous outer surface.

TABLE 17

| Example | Oxygen Flux[1] | $O_2/N_2$ Separation Factor |
|---|---|---|
| 149 | 6.0 | 6.0-7.5 |
| 150 | 8.3-8.8 | 7.0-7.1 |

[1]Units ($1 \times 10^{-6}$) scc/(cm$^2$ sec cm Hg).

EXAMPLE 151

Hollow fibers are extruded from an extrusion blend containing about 52.0 weight percent tetrabromobisphenol A polycarbonate, about 32.6 weight percent N-methyl-2-pyrrolidinone, and about 15.4 weight percent triethylene glycol in a twin screw extruder at about 55°-60° C. into an air quench zone at about 20°-50° C. for about 0.8 seconds before quenching the fibers in a water bath at about 3°-4° C. for about 2.5 seconds The fibers are then leached in water at about 75°-85° C. for about 8 minutes before being dried. The fibers are fabricated into test units and the single gas fluxes measured at a feed pressure of about 50 psig (344.7 kPa) and a temperature of about 35° C. in a manner similar to that described in Examples 1-14. Data are reported in Table 18.

TABLE 18

| Gas Flux $\left( \dfrac{cm^3 \text{ (STP)}}{cm^2 \text{ sec cmHg}} \right)$ | Separation Factor | | |
|---|---|---|---|
| $H_2$ | $H_2/CH_4$ | $H_2/C_2H_4$ | $H_2/C_2H_6$ |
| $12.9 \times 10^{-5}$ | 120 | 53 | 194 |

Example 152—Effect of Annealing

Hollow fibers of tetrabromobisphenol A polycarbonate are extruded as described in Examples 149-150. The fibers are annealed at about 90° C. for 4 days. Single gas fluxes are measured at a feed pressure of about 50 psig (344.7 kPa) and a temperature of about 50° C. Data are shown in Table 19. Annealing increases the gas separation factor significantly while decreasing the gas flux.

TABLE 19

| Gas Flux $\left( \dfrac{cm^3 \text{ (STP)}}{cm^2 \text{ sec cmHg}} \right)$ | Separation Factor | | | |
|---|---|---|---|---|
| $H_2$ | $H_2/CH_4$ | $H_2/C_2H_4$ | $H_2/C_2H_6$ | $H_2/N_2$ |
| unannealed $22.2 \times 10^{-5}$ | 104.4 | 60.9 | 205.9 | 83.8 |
| annealed $7.11 \times 10^{-5}$ | 114.2 | 73.2 | 433.6 | 106.3 |

Example 153

Hollow fibers are extruded at a rate of about 130 feet/minute (39.6 meters/minute) from an extrusion blend containing about 50 weight percent tetrabromobisphenol A polycarbonate and about 50 weight percent N-methyl-2-pyrrolidone and triethylene glycol in about a 2.3 solvent/non-solvent ratio as described in U.S. Pat. No. 4,772,392, the relevant portions incorporated herein by reference. The fibers are extruded in a twin screw extruder at about 55°-60° C. into an air quench zone at about 20°-50° C. for about 0.8 seconds before quenching the fibers in a water bath at about 3°-4° C. for about 2.5 seconds. The fibers are then leached in water at about 75°-85° C. for about 8 minutes. Next the fibers are flushed with water at about 60° C. for about 3 hours before being heat treated at about 60° C. for about 24 hours. The fibers are fabricated into test units and the single gas fluxes measured as reported in Table 20. Electron micrographs of the fibers show a dense inside surface and a porous outer surface.

TABLE 20

| Example | Oxygen Flux[1] | $O_2/N_2$ Separation Factor |
|---|---|---|
| 153 | 12.5 | 7.2 |

[1]Units ($1 \times 10^{-6}$ scc/(cm$^2$ sec cm Hg).

EXAMPLES 154-157

A mixture comprising about 44.5 percent by weight polyphenylene oxide and about 55.5 percent by weight N-methyl-2-pyrrolidinone/triethylene glycol in about an 8:1 solvent/non-solvent ratio is added to the resin kettle of a melt pot extruder equipped with a hollow fiber spinnerette and pack assembly. The mixture is heated with agitation to about 140° C. for at least two hours to form a homogeneous fluid. The mixture is then held at a temperature of between about 110°-120° C. Nitrogen at a pressure of about 40-50 psia (2.8-3.5 Pa) is used to blanket the mixture in the resin kettle and to force the mixture into the suction port of the melt pump. The heated mixture is pumped through the spinnerette pack, which is at a temperature of about 90°-100° C., using nitrogen as the core gas to prevent collapse of the hollow fibers as they exit the spinnerette. The hollow fibers are passed through about a 12 inch (30.48 centimeter) shroud followed by about a 6 inch (15.24 centimeter) air gap before being quenched in water at ambient temperature using a line speed of about 90 feet/minute (27.43 meters/minute). The fiber is annealed in water at about 90° C. for about 10 minutes. The fibers are removed from the leach bath and stored in water at ambient temperature.

The fibers are dried by either direct drying in ambient temperature air, by first immersing the fibers overnight at ambient temperature in a mixture of isopropyl alcohol and isooctane in a 10:1 or 5:1 volume ratio or a mixture of isopropyl alcohol and hexane in a 10:1 volume ratio and then drying at ambient temperature in a hood. The fibers are assembled into test devices and the gas separation properties measured in a manner similar to that described in Examples 1-14 and reported in Table 21. The fibers are examined by scanning electron microscopy and determined to have an internal surface which is non-porous and an external surface which is porous.

TABLE 21

| Example | Drying Condition | Oxygen Flux[1] | $O_2/N_2$ Separation Factor |
|---|---|---|---|
| 154 | air | 1.53 | 0.93 |
| 155 | IPA/ISO 10:1 | 1.20 | 4.4 |
| 156 | IPA/ISO 5:1 | 1.43 | 4.0 |
| 157 | IPA/hexane | 21.6 | 0.92 |

TABLE 21-continued

| Example | Drying Condition | Oxygen Flux[1] | O₂/N₂ Separation Factor |
|---|---|---|---|
| | 10:1 | | |

IPA = isopropyl alcohol
ISO = isooctane
[1]Units (1 × 10⁻⁶) scc/(cm² sec cm Hg).

EXAMPLES 158–162

A mixture comprising about 47.0 percent by weight polyphenylene oxide and about 53.0 percent by weight N-methyl-2-pyrrolidinone/triethylene glycol in about an 8:1 solvent/non-solvent ratio is extruded into hollow fibers in a manner similar to that of Examples 154–157. The fibers are determined to have a non-porous internal surface and a porous external surface by scanning electron microscopy. The fibers are assembled into test devices and evaluated in a manner similar to that described in Examples 1–14. Results are reported in Table 22.

TABLE 22

| Example | Drying Condition | Oxygen Flux[1] | O₂/N₂ Separation Factor |
|---|---|---|---|
| 158 | air | 0.18 | 3.3 |
| 159 | IPA/ISO 10:1 | 0.97 | 3.4 |
| 160 | IPA/ISO 5:1 | 1.69 | 2.7 |
| 161 | IPA/hexane 5:1 | 0.84 | 4.3 |
| 162 | IPA/hexane 10:1 | 0.88 | 4.5 |

IPA = isopropyl alcohol
ISO = isooctane
[1]Units (1 × 10⁻⁶) scc/(cm² sec cm Hg).

EXAMPLES 163–165

A mixture comprising about 44.5 percent by weight polyphenylene oxide and about 55.5 percent by weight N-methyl-2-pyrrolidinone/polyethylene glycol 400 in about a 7:1 solvent/non-solvent ratio is extruded in a manner similar to that of Examples 154–157. The fibers are determined to have an internal non-porous surface by scanning electron microscopy. The fibers are assembled into test cells and evaluated in a manner similar to that described in Examples 1–14. Results are reported in Table 23.

TABLE 23

| Example | Drying Condition | Oxygen Flux[1] | O₂/N₂ Separation Factor |
|---|---|---|---|
| 163 | air | 4.20 | 0.92 |
| 164 | IPA/hexane 10:1 | 0.97 | 3.4 |
| 165 | IPA/hexane 5:1 | 2.00 | 1.5 |

IPA = isopropyl alcohol
ISO = isooctane
[1]Units (1 × 10⁻⁶) scc/(cm² sec cm Hg).

What is claimed is:

1. A semi-permeable hollow fiber membrane comprising a hydrophobic polymeric material, which possesses an equilibrium water content at about 25° C. of less than about 1 weight percent, said hollow fiber membrane having a thin non-external discriminating region and at least one generally porous region, wherein the discriminating region functions to selectively separate at least one gaseous component from other gaseous components in a gas mixture, wherein the discriminating region and porous region(s) are comprised of the same polymeric material.

2. The hollow fiber membrane of claim 1 comprising a thin discriminating region at or near the internal surface of the hollow fiber membrane and a generally porous region extending from the discriminating region to the external surface of the hollow fiber membrane.

3. The hollow fiber membrane of claim 2 wherein the discriminating region at or near the internal surface of the hollow fiber membrane is formed using a core gas.

4. The hollow fiber membrane of claim 3 wherein the hydrophobic polymeric material comprises a polycarbonate, polyester, polyestercarbonate, polysulfone, polyolefin, polyphenylene oxide, polyphenylene sulfide, polyether, fluorinated polyimide, polystyrene, polyetheretherketone, polyetherketone, polyetherimide or polyamideimide.

5. The hollow fiber membrane of claim 4 wherein the hydrophobic polymeric material comprises a polycarbonate, polyphenylene oxide, or polysulfone.

6. The hollow fiber membrane of claim 5 wherein the hydrophobic polymeric material comprises a polycarbonate.

7. The hollow fiber membrane of claim 6 wherein the polycarbonate is derived from bisphenols wherein at least about 25 weight percent of the bisphenol moieties in the polycarbonate backbone are tetra-substituted.

8. The hollow fiber membrane of claim 7 wherein the polycarbonate corresponds to the formula:

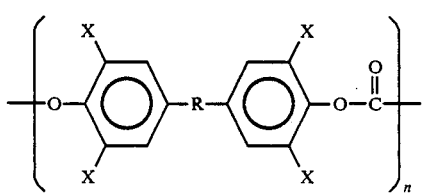

Formula I wherein
R is —CO—, —S—, —SO₂—, —O—, a C₁₋₆ divalent hydrocarbon radical, a C₁₋₆ divalent fluorocarbon radical, or an inertly substituted C₁₋₆ divalent hydrocarbon radical;
X at each occurrence is independently hydrogen, chlorine, bromine, fluorine, or C₁₋₄ alkyl; and
n is a positive real number, such that the polycarbonate possesses sufficient molecular weight to prepare a hollow fiber membrane with suitable characteristics.

9. The hollow fiber membrane of claim 8 wherein the polycarbonate is derived from bisphenols wherein at least about 50 weight percent of the bisphenol moieties in the polycarbonate backbone are bromine or chlorine.

10. The hollow fiber membrane of claim 9 wherein the oxygen flux through the hollow fiber membrane is at least about 1×10⁻⁶ cm³ (STP)/(cm² s cmHg).

11. The hollow fiber membrane of claim 10 wherein the gas separation factor for oxygen/nitrogen at about 25° C. is at least about 6.

12. The hollow fiber membrane of claim 9 wherein the hydrogen flux through the hollow fiber membrane is at least about 1×10⁻⁵ cm³ (STP)/(cm² s cmHg).

13. The hollow fiber membrane of claim 12 wherein the gas separation factor for hydrogen/light hydrocarbons at about 25° C. is at least about 25.

14. The hollow fiber membrane of claim 9 wherein the polycarbonate is tetrabromobisphenol A polycarbonate.

15. The hollow fiber membrane of claim 1 comprising a generally porous region at or near the external surface of the hollow fiber membrane, a generally porous region at or near the internal surface of the hollow fiber membrane, and a thin discriminating region generally situated between the two porous surface regions.

16. The hollow fiber membrane of claim 15 wherein the hydrophobic polymeric material comprises a polycarbonate, polyester, polyestercarbonate, polysulfone polyolefin, polyphenylene oxide, polyphenylene sulfide, polyether, fluorinated polyimide, polystyrene, polyetheretherketone, polyetherketone, polyetherimide, or polyamideimide.

17. The hollow fiber membrane of claim 16 wherein the hydrophobic polymeric material comprises a polycarbonate, polyphenylene oxide, or polysulfone.

18. The hollow fiber membrane of claim 17 wherein the hydrophobic polymeric material comprises a polycarbonate.

19. The hollow fiber membrane of claim 18 wherein the polycarbonate is derived from bisphenols wherein at least about 25 weight percent of the bisphenol moieties in the polycarbonate backbone are tetra-substituted.

20. The hollow fiber membrane of claim 19 wherein the polycarbonate corresponds to the formula:

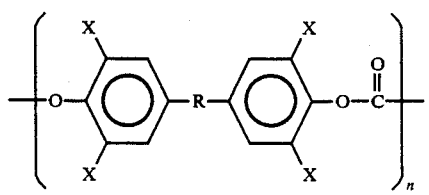

Formula I wherein
R is —CO—, —S—, —SO$_2$—, —O—, a C$_{1-6}$ divalent hydrocarbon radical, a C$_{1-6}$ divalent fluorocarbon radical, or an inertly substituted C$_{1-6}$ divalent hydrocarbon radical;
X at each occurrence is independently hydrogen, chlorine, bromine, fluorine, or C$_{1-4}$ alkyl; and
n is a positive real number, such that the polycarbonate possesses sufficient molecular weight to prepare a hollow fiber membrane with suitable characteristics.

21. The hollow fiber membrane of claim 20 wherein the polycarbonate is derived from bisphenols wherein at least about 50 weight percent of the bisphenol moieties in the polycarbonate backbone are bromine or chlorine.

22. The hollow fiber membrane of claim 21 wherein the oxygen flux through the hollow fiber membrane is at least about $1 \times 10^{-6}$ cm$^3$ (STP)/(cm$^2$ s cmHg).

23. The hollow fiber membrane of claim 22 wherein the gas separation factor for oxygen/nitrogen at about 25° C. is at least about 6.

24. The hollow fiber membrane of claim 21 wherein the hydrogen flux through the hollow fiber membrane is at least about $1 \times 10^{-5}$ cm$^3$ (STP)/(cm$^2$ s cmHg).

25. The hollow fiber membrane of claim 24 wherein the gas separation factor for hydrogen/light hydrocarbons at about 25° C. is at least about 25.

26. The hollow fiber membrane of claim 21 wherein the polycarbonate is tetrabromobisphenol A polycarbonate.

27. The hollow fiber membrane of claim 1 wherein within the porous region(s), a substantial majority of the pores are between about 10 to about 10,000 Angstroms in size.

28. A method for separating at least one gaseous component from other gaseous components of a gas mixture comprising:
(A) contacting the internal surface of a semi-permeable hollow fiber membrane with a feed gas mixture under pressure, wherein the hollow fiber membrane separates a higher pressure region inside the hollow fiber membrane from a lower pressure region outside of the hollow fiber membrane;
(B) maintaining a pressure differential across the hollow fiber membrane under conditions such that at least one gaseous component in the feed gas mixture selectively permeates through the hollow fiber membrane from the inside higher pressure region to the outside lower pressure region;
(C) removing from the outside lower pressure region of the hollow fiber membrane permeated gas which is enriched in at least one gaseous component; and
(D) removing from the inside higher pressure region of the hollow fiber membrane nonpermeated gas which is depleted in at least one gaseous component;
wherein the hollow fiber membrane comprises a hydrophobic polymeric material, which possesses an equilibrium water content at about 25° C. of less than about 1 weight percent, said hollow fiber membrane possessing a thin non-external discriminating region and at least one generally porous region, wherein the discriminating region and porous region(s) are comprised of the same polymeric material.

29. The method of claim 28 wherein the hollow fiber membrane comprises a thin discriminating region at or near the internal surface of the hollow fiber membrane and a generally porous region extending from the discriminating region to the external surface of the hollow fiber membrane.

30. The method of claim 29 wherein the thin discriminating region at or near the internal surface of the hollow fiber membrane is formed using a core gas.

31. The method of claim 30 wherein the hydrophobic polymeric material comprises a polycarbonate, polyester, polyestercarbonate, polysulfone, polyolefin, polyphenylene oxide, polyphenylene sulfide, polyether, fluorinated polyimide, polyetheretherketone, polyetherketone, polystyrene, polyetherimide, or polyamideimide.

32. The method of claim 31 wherein the hydrophobic polymeric material comprises a polycarbonate, polypheylene oxide, or polysulfone.

33. The method of claim 32 wherein the hydrophobic polymeric material comprises a polycarbonate.

34. The method of claim 33 wherein the polycarbonate is derived from bisphenols wherein at least about 25 weight percent of the bisphenol moieties in the polycarbonate backbone are tetra-substituted.

35. The method of claim 34 wherein the polycarbonate corresponds to the formula:

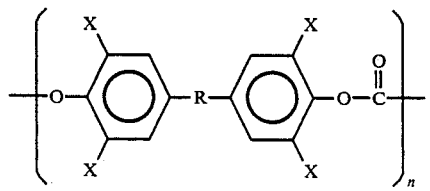

Formula I wherein
R is —CO—, —S—, —SO$_2$—, —O—, a C$_{1-6}$ divalent hydrocarbon radical, a C$_{1-6}$ divalent fluorocarbon radical, or an inertly substituted C$_{1-6}$ divalent hydrocarbon radical;

X at each occurrence is independently hydrogen, chlorine, bromine, fluorine, or C$_{1-4}$ alkyl; and n is a positive real number, such that the polycarbonate possesses sufficient molecular weight to prepare a hollow fiber membrane with suitable characteristics.

36. The method of claim 35 wherein the polycarbonate is derived from bisphenols wherein at least about 50 weight percent of the bisphenol moieties in the polycarbonate backbone are bromine or chlorine.

37. The method of claim 36 wherein the feed gas mixture contains at least one of the gases selected from the group consisting of hydrogen, helium, oxygen, nitrogen, carbon monoxide, carbon dioxide, water vapor, ammonia, hydrogen sulfide, or light hydrocarbons.

38. The method of claim 37 wherein the oxygen flux through the hollow fiber membrane is at least about $1 \times 10^{-6}$ cm$^3$ (STP)/(cm$^2$ s cmHg).

39. The method of claim 38 wherein the gas separation factor for oxygen/nitrogen at about 25° C. is at least about 6.

40. The method of claim 37 wherein the hydrogen flux through the hollow fiber membrane is at least about $1 \times 10^{-5}$ cm$^3$ (STP)/(cm$^2$ s cmHg).

41. The method of claim 40 wherein the gas separation factor for hydrogen/light hydrocarbons at about 25° C. is at least about 25.

42. The method of claim 37 wherein the feed pressure is between about 35 and about 2000 psig.

43. The method of claim 42 wherein the temperature is between about 0° and about 150° C.

44. The method of claim 37 wherein the polycarbonate is tetrabromobisphenol A polycarbonate.

45. The method of claim 28 wherein the hollow fiber membrane comprises a generally porous region at or near the external surface of the hollow fiber membrane, a generally porous region at or near the internal surface of the hollow fiber membrane, and a thin discriminating region generally situated between the two porous surface regions.

46. The method of claim 45 wherein the hydrophobic polymeric material comprises a polycarbonate, polyester, polyestercarbonate, polysulfone, polyolefin, polyphenylene oxide, polyphenylene sulfide, polyether, fluorinated polyimide, or polystyrene, polyetheretherketone, polyetherketone, polyetherimide, or polyamideimide.

47. The method of claim 46 wherein the hydrophobic polymeric material comprises a polycarbonate, polyphenylene oxide, or polysulfone.

48. The method of claim 47 wherein the hydrophobic polymeric material comprises a polycarbonate.

49. The method of claim 48 wherein the polycarbonate is derived from bisphenols wherein at least about 25 weight percent of the bisphenol moieties in the polycarbonate backbone are tetra-substituted.

50. The method of claim 49 wherein the polycarbonate corresponds to the formula:

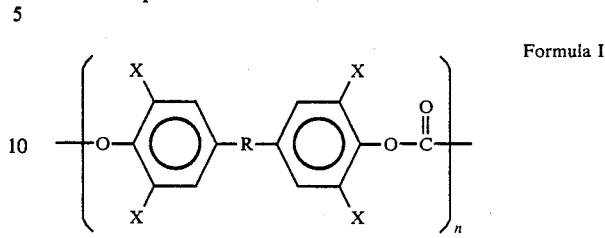

Formula I wherein
R is —CO—, —S—, —SO$_2$—, —O—, a C$_{1-6}$ divalent hydrocarbon radical, a C$_{1-6}$ divalent fluorocarbon radical, or an inertly substituted C$_{1-6}$ divalent hydrocarbon radical;

X at each occurrence is independently hydrogen, chlorine, bromine, fluorine, or C$_{1-4}$ alkyl; and n is a positive real number, such that the polycarbonate possesses sufficient molecular weight to prepare a hollow fiber membrane with suitable characteristics.

51. The method of claim 50 wherein the polycarbonate is derived from bisphenols wherein at least about 50 weight percent of the bisphenol moieties in the polycarbonate backbone are bromine or chlorine.

52. The method of claim 51 wherein the feed gas mixture contains at least one of the gases selected from the group consisting of hydrogen, helium, oxygen, nitrogen, carbon monoxide, carbon dioxide, water vapor, ammonia, hydrogen sulfide, or light hydrocarbons.

53. The method of claim 52 wherein the oxygen flux through the hollow fiber membrane is at least about $1 \times 10^{-6}$ cm$^3$ (STP)/(cm$^2$ s cmHg).

54. The method of claim 53 wherein the gas separation factor for oxygen/nitrogen at about 25° C. is at least about 6.

55. The method of claim 52 wherein the hydrogen flux through the hollow fiber membrane is at least about $1 \times 10^{-5}$ cm$^3$ (STP)/(cm$^2$ s cmHg).

56. The method of claim 55 wherein the gas separation factor for hydrogen/light hydrocarbons at about 25° C. is at least about 25.

57. The method of claim 52 wherein the feed pressure is between about 35 and about 2000 psig.

58. The method of claim 57 wherein the temperature is between about 0° and about 150° C.

59. The method of claim 52 wherein the polycarbonate is tetrabromobisphenol A polycarbonate.

60. The method of claim 29 wherein within the porous region(s), a substantial majority of the pores are about 10 to about 10,000 Angstroms in size.

61. A process for preparing a semi-permeable hollow fiber membrane comprising:
(A) forming a mixture comprising:
  (i) a hydrophobic polymeric material, other than tetrahalogenated polycarbonate, possessing an equilibrium water content at about 25° C. of less than about 1 weight percent and which is capable of being formed into a membrane,
  (ii) at least one solvent for the polymeric material, and
  (iii) at least one non-solvent for the polymeric material;

wherein the mixture comprises less than about 1 weight percent water;

(B) heating the mixture to a temperature at which the mixture forms a homogeneous fluid and possesses sufficient viscosity at extrusion conditions to permit extrusion of at least one hollow fiber membrane;

(C) extruding the mixture into a hollow fiber membrane using a core gas;

(D) passing the hollow fiber membrane through at least gaseous quench zone under conditions such that the mixture cools and begins to phase separate while minimizing the loss of solvent(s) and non-solvent(s) from the external surface of the hollow fiber membrane;

(E) passing the hollow fiber membrane through at least one liquid quench zone comprising a liquid in which the polymeric material possesses low solubility, wherein a portion of the solvent(s) and non-solvent(s) is removed from the hollow fiber membrane; and (F) simultaneously or consecutively passing the hollow fiber membrane through at least one liquid leach zone comprising a liquid in which the polymeric material possesses low solubility, wherein a significant portion of the remaining solvent(s) and non-solvent(s) are removed from the hollow fiber membrane;

wherein the hollow fiber membrane so formed possesses a thin non-external discriminating region and at least one generally porous region, wherein the discriminating layer functions to selectively separate at least one gaseous component from other gaseous components in a gas mixture.

62. The process of claim 61 wherein the temperature, relative humidity, and residence time in the gaseous quench zone are such that water diffuses substantially into the hollow fiber membrane before passing into the liquid quench zone.

63. The process of claim 62 wherein the hollow fiber membrane so formed possesses a thin discriminating region at or near the internal surface of the hollow fiber membrane and a generally porous region extending from the discriminating region to the external surface of the hollow fiber membrane.

64. The process of claim 63 wherein the extrusion temperature is between about 50° and about 280° C.

65. The process of claim 64 wherein the gaseous quench zone comprises air.

66. The process of claim 65 wherein the gaseous quench zone temperature is in the range of from about 0° to about 120° C.

67. The process of claim 66 wherein the gaseous quench zone relative humidity at about 24° C. is in the range of from about 20 to about 80 percent.

68. The process of claim 67 wherein the residence time within the gaseous quench zone is between about 0.05 and about 10 seconds.

69. The process of claim 68 wherein the liquid quench zone(s) comprise lower alcohols, water, fluorocarbons, lower aliphatic hydrocarbons, or mixtures thereof.

70. The process of claim 69 wherein the hollow fiber membrane is passed through at least one liquid quench zone and at least one liquid leach zone wherein the hollow fiber membrane is passed through the liquid quench zone(s) under conditions such that the mixture undergoes at least partial phase separation in said quench zone(s), and the hollow fiber membrane is then passed through the liquid leach zone(s) under conditions such that the solvent(s) and non-solvent(s) are substantially removed from the hollow fiber membrane and phase separation is substantially completed.

71. The process of claim 70 wherein the liquid quench zone(s) temperature is in the range of from about 0° to about 30° C.

72. The process of claim 71 wherein the residence time within the liquid quench zone(s) is between about 0.05 and about 600 seconds.

73. The process of claim 72 wherein the liquid quench zone(s) comprise water.

74. The process of claim 72 wherein the liquid leach zone(s) comprise lower alcohols, water, fluorocarbons, lower aliphatic hydrocarbons, or mixtures thereof.

75. The process of claim 74 wherein the liquid leach zone(s) temperature is in the range of from about 50° to about 120° C.

76. The process of claim 75 wherein residence time within the liquid leach zone(s) is between about 0.5 and about 240 minutes.

77. The process of claim 76 wherein the liquid leach zone(s) comprise water.

78. The process of claim 76 wherein the hydrophobic polymeric material comprises a non-tetrahalogenated polycarbonate, polyester, polyestercarbonate, polysulfone, polyolefin, polyphenylene oxide, polyphenylene sulfide, polyether, fluorinated polyimide, polystyrene, polyetheretherketone, polyetherketone, polyetherimide, or polyamideimide.

79. The process of claim 78 wherein the hydrophobic polymeric material comprises a non-tetrahalogenated polycarbonate, polysulfone, or polyphenylene oxide.

80. The process of claim 78 wherein the solvent comprises a glycol ether corresponding to the formula $R^3O-(CH_2CH_2)_r-R^3$ wherein $R^3$ is independently in each occurrence methyl or ethyl, and r is an integer of between about 1 and about 20; a dialkyl ketone wherein the alkyl groups independently are methyl or ethyl; morpholine substituted on the nitrogen atom with an alkyl, formyl, or alkanoyl moiety: pyrrolidinone or N-$C_{1-4}$ alkyl, N-$C_{5-6}$ cycloalkyl, or N-$C_{6-10}$ aryl or alkaryl substituted pyrrolidinone: $C_{1-4}$ alkoxycarbonyl, formyl, nitro, or halo substituted benzene: tetrahydrofuran; dimethyl formamide; cyclohexanone; N,N-dimethyl acetamide; acetophenone; methylene chloride; sulfolane; cyclohexyl acetate; 1,1,3,3-tetramethylurea; isophorone; caprolactone; 1-formylpiperidine; methyl salicylate; hexymethylphosphoramide; phenyl ether; or bromoanaphthalene; or mixtures thereof; and wherein the non-solvent comprises a glycol or glycol ether corresponding to the formula $R^4-(CH_2CH_2)_q-R^4$ wherein $R^4$ is independently in each occurrence hydrogen or $C_{1-4}$ alkyl, and q is an integer of about 1 to about 250; an ester corresponding to the formula $R^5COOR^6$ wherein $R^5$ is hydrogen or $C_{1-19}$ alkyl, and $R^6$ is $C_{1-10}$ alkyl; a $C_{1-10}$ alkanol; cyclohexane, unsubstituted or substituted with an alkyl, cycloalkyl, or perfluoroalkyl moiety; a $C_{5-20}$ alkane; a dialkyl ketone wherein at least one of the alkyl moieties is $C_3$ or greater; an amide corresponding to the formula $R^7CONHR^8$ wherein $R^7$ is hydrogen or $C_{1-10}$ alkyl, and $R^8$ is $C_{1-10}$ alkyl; an acetyl or $C_{1-10}$ alkyl nitrile; acetone; a $C_{1-10}$ alkyl aldehyde; a trialkyl amine; nitromethane; trialkyl ortho-formate; diacetone alcohol; dimethyl malonate; decahydronaphthalene; tetrahydronaphthalene; malononitrile; dicyclohexyl: ethylene carbonate; sulfolane; alkyl or cycloalkyl substituted benzene; water; or mixtures thereof.

81. The process of claim 80 wherein the solvent comprises N-methyl-2-pyrrolidinone, ethylene glycol dimethyl ether, tetrahydrofuran, diethylene glycol dimethyl ether, acetophenone, methylene chloride, cyclohexanone, or mixtures thereof; and the non-solvent comprises water, diisopropyl ketone, tetraethylene glycol dimethyl ether, diethylene glycol dibutyl ether, hexadecane, diethylene glycol, triethylene glycol, polyethylene glycol with a molecular weight of up to about 1450, 2-ethoxyethanol, carbon tetrachloride, dodecane, or mixtures thereof.

82. The process of claim 81 wherein the solvent/non-solvent pair is N-methyl-2-pyrrolidinone and triethylene glycol, N-methyl-2-pyrrolidinone and polyethylene glycol with a molecular weight of up to about 1450, ethylene glycol dimethyl ether and water, tetrahydrofuran and water, ethylene glycol dimethyl ether and diisopropyl ketone, tetrahydrofuran and diisopropyl ketone, diethylene glycol dimethyl ether and water, diethylene glycol dimethyl ether and tetraethylene glycol dimethyl ether, acetophenone and diethylene glycol dibutyl ether, methylene chloride and carbon tetrachloride, or acetophenone and hexadecane.

83. The process of claim 82 wherein the solvent/non-solvent pair is N-methyl-2-pyrrolidinone and triethylene glycol, or N-methyl-2-pyrrolidinone and polyethylene glycol with a molecular weight of up to about 400.

84. The process of claim 62 wherein the hollow fiber membrane so formed possesses a generally porous region at or near the external surface of the hollow fiber membrane, a generally porous region at or near the internal surface of the hollow fiber membrane, and a discriminating region generally situated between the two porous surface regions.

85. The process of claim 84 wherein the extrusion temperature is between about 50° and about 280° C.

86. The process of claim 85 wherein the gaseous quench zone comprises air.

87. The process of claim 86 wherein the gaseous quench zone temperature is in the range of from about 0° to about 120° C.

88. The process of claim 87 wherein the gaseous quench zone relative humidity at about 24° C. is in the range of from about 20 to about 80 percent.

89. The process of claim 88 wherein the residence time within the gaseous quench zone is between about 0.05 and about 10 seconds.

90. The process of claim 89 wherein the liquid quench zone(s) comprise lower alcohols, water, fluorocarbons, lower aliphatic hydrocarbons, or mixtures thereof.

91. The process of claim 90 wherein the hollow fiber membrane is passed through at least one liquid quench zone and at least one liquid leach zone wherein the hollow fiber membrane is passed through the liquid quench zone(s) under conditions such that the mixture undergoes at least partial phase separation in said quench zone(s), and the hollow fiber membrane is then passed through the liquid leach zone(s) under conditions such that the solvent(s) and non-solvent(s) are substantially removed from the hollow fiber membrane and phase separation is substantially completed.

92. The process of claim 91 wherein the liquid quench zone(s) temperature is in the range of from about 0° to about 30° C.

93. The process of claim 92 wherein the residence time within the liquid quench zone(s) is between about 0.05 and about 600 seconds.

94. The process of claim 93 wherein the liquid quench zone(s) comprise water.

95. The process of claim 93 wherein the liquid leach zone(s) comprise lower alcohols, water, fluorocarbons, lower aliphatic hydrocarbons, or mixtures thereof.

96. The process of claim 95 wherein the liquid leach zone(s) temperature is in the range of from about 50° to about 120° C.

97. The process of claim 96 wherein residence time within the liquid leach zone(s) is between about 0.5 and about 240 minutes.

98. The process of claim 96 wherein the liquid leach zone(s) comprise water.

99. The process of claim 96 wherein the hydrophobic polymeric material comprises a non-tetrahalogenated polycarbonate, polyester, polyestercarbonate, polysulfone, polyolefin, polyphenylene oxide, polyphenylene sulfide, polyether, fluorinated polyimide, polystyrene, polyetherketone, polyetheretherketone, polyetherimide, or polyamideimide.

100. The process of claim 99 wherein the hydrophobic polymeric material comprises a non-tetrahalogenated polycarbonate, polyphenylene oxide, or polysulfone.

101. The process of claim 99 wherein the solvent comprises a glycol ether corresponding to the formula $R^3O-(CH_2CH_2)_r-R^3$ wherein $R^3$ is independently in each occurrence methyl or ethyl, and r is an integer of between about 1 and about 20; a dialkyl ketone wherein the alkyl groups independently are methyl or ethyl; morpholine substituted on the nitrogen atom with an alkyl, formyl, or alkanoyl moiety; pyrrolidinone or N-$C_{1-4}$ alkyl, N-$C_{5-6}$ cycloalkyl, or N-$C_{6-10}$ aryl or alkaryl substituted pyrrolidinone; $C_{1-4}$ alkoxycarbonyl, formyl, nitro, or halo substituted benzene; tetrahydrofuran; dimethyl formamide; cyclohexanone; N,N-dimethyl acetamide; acetophenone; methylene chloride; sulfolane; cyclohexyl acetate; 1,1,3,3-tetramethylurea; isophorone; caprolactone; 1-formylpiperidine; methyl salicylate; hexymethylphosphoramide; phenyl ether; or bromoanaphthalene; or mixtures thereof; and wherein the non-solvent comprises a glycol or glycol ether corresponding to the formula $R^4-(CH_2CH_2)_q-R^4$ wherein $R^4$ is independently in each occurrence hydrogen or $C_{1-4}$ alkyl, and q is an integer of about 1 to about 250; an ester corresponding to the formula $R^5COOR^6$ wherein $R^5$ is hydrogen or $C_{1-19}$ alkyl, and $R^6$ is $C_{1-10}$ alkyl; a $C_{1-10}$ alkanol; cyclohexane, unsubstituted or substituted with an alkyl, cycloalkyl, or perfluoroalkyl moiety; a $C_{5-20}$ alkane; a dialkyl ketone wherein at least one of the alkyl moieties is $C_3$ or greater: an amide corresponding to the formula $R^7CONHR^8$ wherein $R^7$ is hydrogen or $C_{1-10}$ alkyl, and $R^8$ is $C_{1-10}$ alkyl; an acetyl or $C_{1-10}$ alkyl nitrile; acetone: a $C_{1-10}$ alkyl aldehyde; a trialkyl amine; nitromethane: trialkyl ortho-formate: diacetone alcohol; dimethyl malonate; decahydronaphthalene; tetrahydronaphthalene; malononitrile; dicyclohexyl; ethylene carbonate; sulfolane; alkyl or cycloalkyl substituted benzene; water; or mixtures thereof.

102. The process of claim 101 wherein the solvent comprises N-methyl-2-pyrrolidinone, ethylene glycol dimethyl ether, tetrahydrofuran, diethylene glycol dimethyl ether, acetophenone, methylene chloride, cyclohexanone, or mixtures thereof; and the non-solvent comprises water, diisopropyl ketone, tetraethylene glycol dimethyl ether, diethylene glycol dibutyl ether, hexadecane, diethylene glycol, triethylene glycol, polyethylene glycol with a molecular weight of up to about 1450, 2-ethoxyethanol, carbon tetrachloride, dodecane, or mixtures thereof.

103. The process of claim 102 wherein the solvent/non-solvent pair is N-methyl-2-pyrrolidinone and triethylene glycol, N-methyl-2-pyrrolidinone and polyethylene glycol with a molecular weight of up to about 1450, ethylene glycol dimethyl ether and water, tetrahydrofuran and water, ethylene glycol dimethyl ether and diisopropyl ketone, tetrahydrofuran and diisopropyl ketone, diethylene glycol dimethyl ether and water, diethylene glycol dimethyl ether and tetraethylene glycol dimethyl ether, acetophenone and diethylene glycol dibutyl ether, methylene chloride and carbon tetrachloride, or acetophenone and hexadecane.

104. The process of claim 103 wherein the solvent/non-solvent pair is N-methyl-2-pyrrolidinone and triethylene glycol, or N-methyl-2-pyrrolidinone and polyethylene glycol with a molecular weight of up to about 400.

105. The process of claim 63 which comprises the further step of:
(G) drying the hollow fiber membrane.

106. The process of claim 63 wherein within the region(s) a substantial majority of the pores are between about 10 to about 10,000 Angstroms in size.

* * * * *

UNITED STATES PATENT AND TRADEMARK OFFICE
CERTIFICATE OF CORRECTION

PATENT NO. : 4,955,993

DATED : September 11, 1990

INVENTOR(S) : Edgar S. Sanders, Jr., et al.

It is certified that error appears in the above-identified patent and that said Letters Patent is hereby corrected as shown below:

Col. 12, line 27, delete "2.70 kg/m$^2$" and insert -- 12.70 kg/m$^2$ --;

Col. 23, in Table 4, footnote 3, delete "sec/cm$^2$" and insert -- scc/cm$^2$ --;

Col. 26, line 65, delete "fibers dried" and insert -- fibers are dried --;

Col. 28, line 28, in Table 13, under the subheading Relative Solubility, for Compound tricresyl phosphate, delete "5.5% f" and insert -- 5.0% f --;

Col. 28, line 31, in Table 13, under the subheading Relative Solubility, for Compound n-octyl acetate, delete "50.5%" and insert -- 50.1% --;

UNITED STATES PATENT AND TRADEMARK OFFICE
CERTIFICATE OF CORRECTION

PATENT NO. : 4,955,993                     Page 2 of 2

DATED      : September 11, 1990

INVENTOR(S) : Edgar S. Sanders, Jr., et al.

It is certified that error appears in the above-identified patent and that said Letters Patent is hereby corrected as shown below:

Col. 28, line 60, in Table 13, under the subheading Relative Solubility, for Compound chlorobenzene, delete "b d g" and insert -- b c g --;

Col. 29, line 6, in Table 13, under the subheading Relative Solubility, for Compound phenyl ether, delete "d f c" and insert -- e f c --.

Signed and Sealed this

Twenty-sixth Day of May, 1992

Attest:

DOUGLAS B. COMER

Attesting Officer    Acting Commissioner of Patents and Trademarks